United States Patent [19]

Yoshida et al.

[11] Patent Number: 5,658,542

[45] Date of Patent: Aug. 19, 1997

[54] EXHAUST GAS CLEANER AND METHOD FOR CLEANING SAME

[75] Inventors: Kiyohide Yoshida; Gyo Muramatsu; Akira Abe; Naoko Irite, all of Kumagaya, Japan

[73] Assignee: Kabushiki Kaisha Riken, Tokyo, Japan

[21] Appl. No.: 340,329

[22] Filed: Nov. 14, 1994

[30] Foreign Application Priority Data

| Jul. 15, 1994 | [JP] | Japan | 6-186564 |
| Jul. 15, 1994 | [JP] | Japan | 6-186594 |
| Jul. 15, 1994 | [JP] | Japan | 6-186606 |

[51] Int. Cl.$^6$ .......................... B01D 53/92; B01D 53/56; B01D 53/94
[52] U.S. Cl. .................. 423/213.2; 423/213.7; 423/239.1; 423/247; 423/245.1
[58] Field of Search ............. 423/213.7, 239.1, 423/239.2, 212.2, 247, 245.1

[56] References Cited

U.S. PATENT DOCUMENTS

| 3,397,034 | 8/1968 | Tulleners et al. | 423/213.7 |
| 3,857,921 | 12/1974 | Tamura et al. | 423/213.5 |
| 3,896,616 | 7/1975 | Keith et al. | 60/274 |
| 5,534,237 | 7/1996 | Yoshida et al. | 423/239.1 |
| 5,589,432 | 12/1996 | Yoshida et al. | 502/325 |

FOREIGN PATENT DOCUMENTS

| 0605251A1 | 7/1994 | European Pat. Off. | |
| 63-100919 | 5/1988 | Japan . | |
| 63-283727 | 11/1988 | Japan . | |
| 1130735 | 5/1989 | Japan . | |
| 1171625 | 7/1989 | Japan | 423/239.2 |
| 4-18914 | 1/1992 | Japan | 423/239.1 |
| 6-71139 | 3/1994 | Japan | 423/239.1 |

OTHER PUBLICATIONS

*Catalytic Cracking of Nitrogen Oxide Over Copper Zeolite(2)*, The 59th Spring Conference of the Japan Chemical Society, Yuu et al. Thesis 2A526, p. 273, Mar. 1990.

*Development of Catalytic Removal Method of Nitrogen Oxides in Presence of $SO_x$*, The 60th Fall Conference of the Japan Chemical Society, Shundo et al. Thesis 3L420, pp. 136–137, Sep. 1990.

*Selective Reduction of Nitrogen Oxide by Hydrocarbons(1): Investigation of Zeolite Catalysts*, The 60th Fall Conference of the Japan Chemical Society, Hamada et al. Thesis 3L422, pp. 140–141, Sep. 1990.

*Selective Reduction of Nitrogen Oxide by Hydrocarbons(2): Investigation of Oxide Catalysts*, The 60th Fall Conference of the Japan Chemical Society, Kintaichi et al. Thesis 3L423, pp. 142–143, Sep. 1990.

Hamada et al, *Selective Catalytic Reduction of Nitrogen Oxides with Hydrocarbons*, Hamada et al. 67th CATSJ Meeting Abstracts: No. A1, vol. 33, No. 2, pp. 59–60, Mar. 1991.

*Primary Examiner*—Gary P. Stevens
*Assistant Examiner*—Timothy C. Vanoy
*Attorney, Agent, or Firm*—Browdy and Neimark

[57] ABSTRACT

Nitrogen oxides are efficiently removed from an exhaust gas containing nitrogen oxides and an excess amount of oxygen, by (i) disposing an exhaust gas cleaner in a flow path of the exhaust gas, the exhaust gas cleaner comprising a first catalyst comprising 0.2–15 weight % (on a metal basis) of at least one silver salt selected from the group consisting of silver halides, silver sulfate and silver phosphate supported on a porous inorganic oxide on an inlet side and a second catalyst comprising (a) 0.2–15 weight % (on a metal basis) of at least one silver salt selected from the group consisting of silver halides, silver sulfate and silver phosphate and (b) up to 2 weight % (on a metal basis) of copper or copper oxide supported on a porous inorganic oxide on an outlet side; (ii) introducing at least one reducing agent selected from hydrocarbons and oxygen-containing organic compounds into the exhaust gas on an upstream side of the exhaust gas cleaner; and (iii) bringing the exhaust gas into contact with the exhaust gas cleaner at a temperature of 200°–600° C.

4 Claims, 6 Drawing Sheets

EXHAUST GAS CLEANER AND METHOD FOR CLEANING SAME

BACKGROUND OF THE INVENTION

The present invention relates to an exhaust gas cleaner for effectively removing nitrogen oxides by reduction and optionally carbon monoxide and hydrocarbons by oxidation from an exhaust gas containing nitrogen oxides and an excess amount of oxygen, and a method for cleaning an exhaust gas with such an exhaust gas cleaner.

Various exhaust gases discharged from internal combustion engines such as automobile engines, etc., combustion apparatuses installed in factories, home fun heaters, etc. contain nitrogen oxides such as nitrogen monoxide and nitrogen dioxide together with an excess amount of oxygen. The term "containing an excess amount of oxygen" means that the oxygen content is larger than its stoichiometric amount relative to unburned components such as carbon monoxide, hydrogen, hydrocarbons in the exhaust gas. The term "nitrogen oxides" (NOx) means nitrogen monoxide and/or nitrogen dioxide.

The nitrogen oxides are one of causes of acid rain, posing a serious problem of environmental pollution. For these reasons, various methods have been proposed to remove nitrogen oxides from exhaust gases emitted from various combustion equipment.

In the case of large, stationary combustion apparatuses such as large combustion apparatuses of factories, ammonia is introduced into an exhaust gas, whereby nitrogen oxides in the exhaust gas are catalytically and selectively reduced (a selective catalytic reduction).

However, such a method is disadvantageous, because ammonia is expensive, because ammonia is so toxic that the amount of ammonia should be controlled by measuring the concentration of nitrogen oxides in the exhaust gas, and because this reduction system generally needs large apparatuses.

There is an alternative method for reducing NOx, which comprises contacting an exhaust gas containing oxygen and NOx with a gaseous reducing agent such as hydrogen, carbon monoxide or hydrocarbons (a non-selective catalytic reduction). However, this method requires a larger amount of the reducing agent than its stoichiometric amount relative to oxygen in the exhaust gas to carry out effective removal of NOx. Accordingly, this method is effective only for the exhaust gas having a relatively low oxygen concentration, which is generated by burning nearly at a theoretical air-fuel ratio.

There have been proposed methods of reducing nitrogen oxides by adding to an exhaust gas hydrocarbons in a smaller amount than a stoichiometric amount relative to oxygen in the exhaust gas, in the presence of a catalyst such as zeolite with or without carrying a transition metal (Japanese Patent Laid-Open Nos. 63-100919, 63-283727 and 1-130735; Thesis 2A526, 1990, the 59th Spring Conference of the Japan Chemical Society; Theses 3L420, 3L422 and 3L423, 1990, the 60th Fall Conference of the Japan Chemical Society; and "Catalyst", Vol. 33, No. 2, p.59 (1991)).

However, these methods are effective only in a narrow temperature range of NOx removal. Also, their efficiency of removing nitrogen oxides is extremely low in the case of an actual exhaust gas because it contains about 10% of moisture.

In addition, though it is important to remove unburned components such as carbon monoxide, hydrocarbons, etc. from an exhaust gas, there has not been proposed a method capable of efficiently removing them together with nitrogen oxides from the exhaust gas.

OBJECT AND SUMMARY OF THE INVENTION

Accordingly, an object of the present invention is to provide an exhaust gas cleaner and a method capable of efficiently removing nitrogen oxides from an exhaust gas containing nitrogen oxides and oxygen in an amount larger than the stoichiometric amount relative to unburned components such as carbon monoxide, hydrogen, hydrocarbons, etc., which is discharged from stationary combustion apparatuses, gasoline engines operated under oxygen excess conditions, and diesel engines.

Another object of the present invention is to provide an exhaust gas cleaner and a method capable of efficiently removing nitrogen oxides by reduction and carbon monoxide and hydrocarbons by oxidation from an exhaust gas containing nitrogen oxides, unburned components such as carbon monoxide, hydrogen, hydrocarbons, etc., and oxygen in an amount larger than the stoichiometric amount relative to the unburned components, such an exhaust gas being discharged from stationary combustion apparatuses, gasoline engines operated under oxygen excess conditions, and diesel engines.

As a result of intense research in view of the above objects, the inventors have found that nitrogen oxides are effectively removed even from an exhaust gas containing about 10% of moisture with improved efficiency in a wide temperature range, by using an exhaust gas cleaner comprising a silver salt such as silver halide, etc. supported on a porous inorganic oxide and Cu, Pt, Au, etc. supported on a porous inorganic oxide, and by adding a reducing agent such as hydrocarbons and oxygen-containing organic compounds to the exhaust gas and bringing the exhaust gas into contact with the exhaust gas cleaner in a particular temperature range. The inventors have further found that nitrogen oxides, carbon monoxide and hydrocarbons are effectively removed even from an exhaust gas containing about 10% of moisture with improved efficiency in a wide temperature range, by using an exhaust gas cleaner comprising a silver salt such as silver halide, etc. supported on a porous inorganic oxide, copper or copper oxide supported on a porous inorganic oxide, and Pt, etc. supported on a porous inorganic oxide, and by adding a reducing agent such as hydrocarbons and oxygen-containing organic compounds to the exhaust gas and bringing the exhaust gas into contact with the exhaust gas cleaner in a particular temperature range. The present invention has been completed based on these findings.

Thus, a first exhaust gas cleaner for removing nitrogen oxides from an exhaust gas containing nitrogen oxides and oxygen in an amount larger than its stoichiometric amount relative to unburned components in the exhaust gas according to the present invention comprises a first catalyst on an inlet side of the exhaust gas cleaner and a second catalyst on an outlet side of the exhaust gas cleaner, the first catalyst comprising 0.2–15 weight % (on a metal basis) of at least one silver salt supported on a porous inorganic oxide, and the second catalyst comprising (a) 0.2–15 weight % (on a metal basis) of at least one silver salt and (b) up to 2 weight % (on a metal basis) of copper or copper oxide supported on a porous inorganic oxide.

A first method for removing nitrogen oxides from an exhaust gas containing nitrogen oxides and oxygen in an amount larger than its stoichiometric amount relative to unburned components in the exhaust gas according to the present invention comprises (i) disposing an exhaust gas cleaner in a flow path of the exhaust gas, the exhaust gas cleaner comprising a first catalyst on an inlet side of the exhaust gas cleaner and a second catalyst on an outlet side of the exhaust gas cleaner, the first catalyst comprising 0.2–15 weight % (on a metal basis) of at least one silver salt supported on a porous inorganic oxide, and the second catalyst comprising (a) 0.2–15 weight % (on a metal basis) of at least one silver salt and (b) up to 2 weight % (on a metal basis) of copper or copper oxide supported on a porous inorganic oxide; (ii) introducing at least one reducing agent selected from hydrocarbons and oxygen-containing organic compounds into the exhaust gas on an upstream side of the exhaust gas cleaner; and (iii) bringing the exhaust gas into contact with the exhaust gas cleaner at a temperature of 200°–600° C., thereby causing a reaction of the nitrogen oxides with the reducing agent to remove the nitrogen oxides.

A second exhaust gas cleaner for cleaning an exhaust gas containing nitrogen oxides, unburned components comprising carbon monoxide and hydrocarbons, and oxygen in an amount larger than its stoichiometric amount relative to the unburned components, by removing nitrogen oxides by reduction and carbon monoxide and hydrocarbons by oxidation from the exhaust gas according to the present invention comprises first, second and third catalysts in this order from an inlet side to an outlet side of the exhaust gas cleaner, the first catalyst comprising 0.2–15 weight % (on a metal basis) of at least one silver salt supported on a porous inorganic oxide, the second catalyst comprising (a) 0.2–15 weight % (on a metal basis) of at least one silver salt and (b) up to 2 weight % (on a metal basis) of copper or copper oxide supported on a porous inorganic oxide, and the third catalyst comprising up to 2 weight % (on a metal basis) of at least one element selected from the group consisting of Pt, Pd, Ru, Rh, Ir and Au supported on a porous inorganic oxide.

A second method for cleaning an exhaust gas containing nitrogen oxides, unburned components comprising carbon monoxide and hydrocarbons, and oxygen in an amount larger than its stoichiometric amount relative to the unburned components, by removing nitrogen oxides by reduction and carbon monoxide and hydrocarbons by oxidation from the exhaust gas according to the present invention comprises (i) disposing an exhaust gas cleaner in a flow path of the exhaust gas, the exhaust gas cleaner comprising first, second and third catalysts in this order from an inlet side to an outlet side of the exhaust gas cleaner, the first catalyst comprising 0.2–15 weight % (on a metal basis) of at least one silver salt supported on a porous inorganic oxide, the second catalyst comprising (a) 0.2–15 weight % (on a metal basis) of at least one silver salt and (b) up to 2 weight % (on a metal basis) of copper or copper oxide supported on a porous inorganic oxide, and the third catalyst comprising up to 2 weight % (on a metal basis) of at least one element selected from the group consisting of Pt, Pd, Ru, Rh, Ir and Au supported on a porous inorganic oxide; (ii) introducing at least one reducing agent selected from hydrocarbons and oxygen-containing organic compounds into the exhaust gas on an upstream side of the exhaust gas cleaner; and (iii) bringing the exhaust gas into contact with the exhaust gas cleaner at a temperature of 200°–600° C., thereby causing a reaction of the nitrogen oxides with the reducing agent to remove nitrogen oxides, carbon monoxide and hydrocarbons.

A third exhaust gas cleaner for removing nitrogen oxides from an exhaust gas containing nitrogen oxides and oxygen in an amount larger than its stoichiometric amount relative to unburned components in the exhaust gas according to the present invention comprises a first catalyst comprising 0.2–15 weight % (on a metal basis) of at least one silver salt having an average diameter of 10–1000 nm and supported on a porous inorganic oxide, and a second catalyst comprising 0.02–5 weight % (on a metal basis) of at least one element selected from the group consisting of Pt, Pd, Ru, Rh, Ir and Au supported on a porous inorganic oxide.

A third method for removing nitrogen oxides from an exhaust gas containing nitrogen oxides and oxygen in an amount larger than its stoichiometric amount relative to unburned components in the exhaust gas according to the present invention comprises (i) disposing an exhaust gas cleaner in a flow path of the exhaust gas, the exhaust gas cleaner comprising a first catalyst comprising 0.2–15 weight % (on a metal basis) of at least one silver salt having an average diameter of 10–1000 nm and supported on a porous inorganic oxide, and a second catalyst comprising 0.02–5 weight % (on a metal basis) of at least one element selected from the group consisting of Pt, Pd, Ru, Rh, Ir and Au supported on a porous inorganic oxide; (ii) introducing at least one reducing agent selected from hydrocarbons and oxygen-containing organic compounds into the exhaust gas on an upstream side of the exhaust gas cleaner; and (iii) bringing the exhaust gas into contact with the exhaust gas cleaner at a temperature of 150°–650° C., thereby causing a reaction of the nitrogen oxides with the reducing agent to remove the nitrogen oxides.

A fourth method for removing nitrogen oxides from an exhaust gas discharged from engines operated by using as a fuel mixed hydrocarbons of liquefied petroleum gas, town gas or liquefied natural gas, the exhaust gas containing nitrogen oxides and oxygen in an amount larger than its stoichiometric amount relative to unburned components in the exhaust gas according to the present invention comprises (i) disposing an exhaust gas cleaner in a flow path of the exhaust gas, the exhaust gas cleaner comprising a first catalyst comprising 0.2–15 weight % (on a metal basis) of at least one silver salt supported on a porous inorganic oxide, and a second catalyst comprising 0.02–5 weight % (on a metal basis) of at least one element selected from the group consisting of Pt, Pd, Ru, Rh, Ir and Au supported on a porous inorganic oxide; (ii) introducing at least one hydrocarbon selected from the group consisting of liquefied petroleum gas, town gas, liquefied natural gas, methane and ethane into the exhaust gas on an upstream side of the exhaust gas cleaner; and (iii) bringing the exhaust gas into contact with the exhaust gas cleaner at a temperature of 150°–650° C., thereby causing a reaction of the nitrogen oxides with the hydrocarbon to remove the nitrogen oxides.

DETAILED DESCRIPTION OF THE INVENTION

Figure 1:
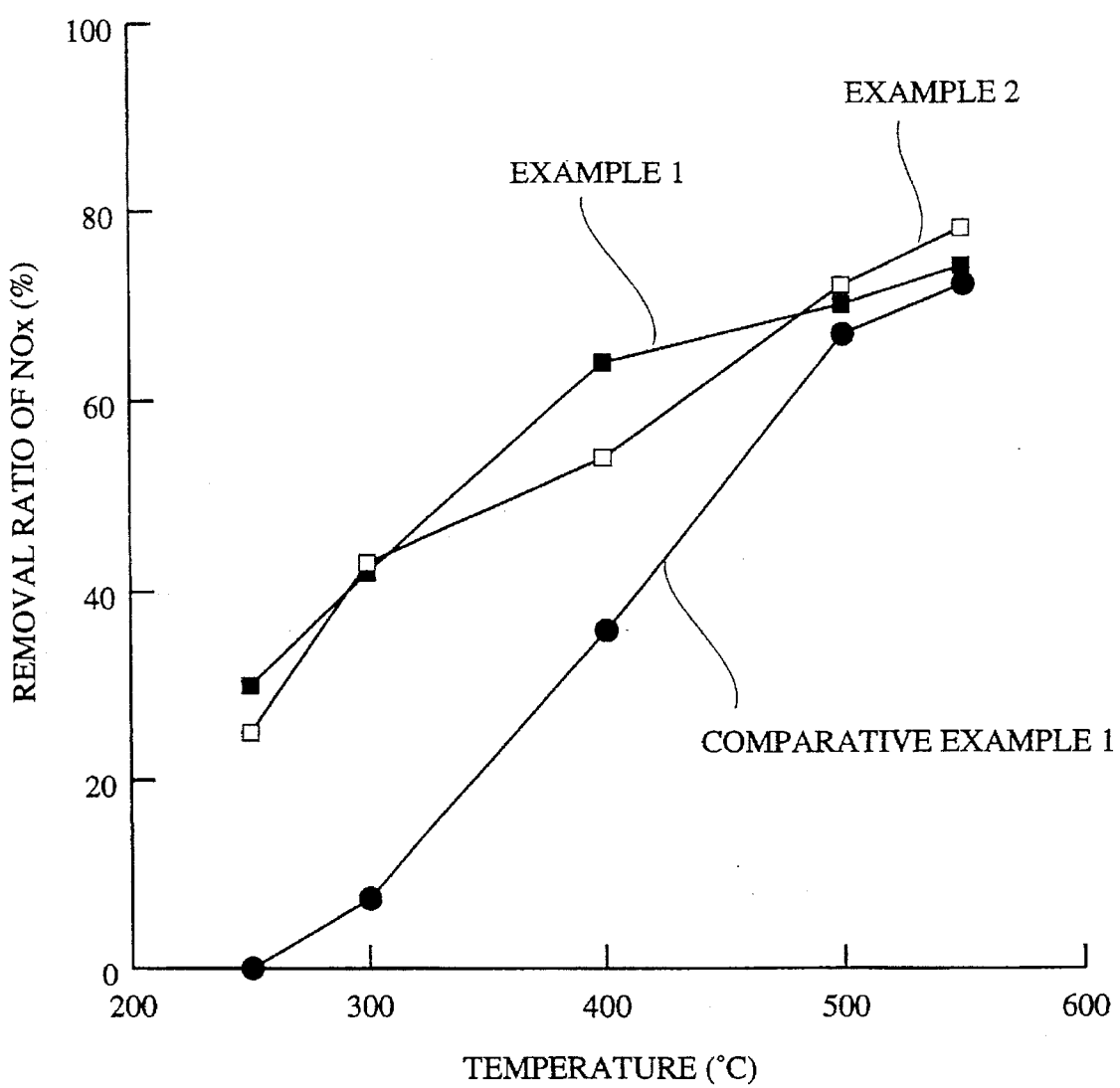
FIG. 1 is a graph showing the relation between the removal ratio of NOx and the temperature of the exhaust gas in Examples 1 and 2 and Comparative Example 1.

The present invention provides the following types of exhaust gas cleaners and the corresponding methods for removing nitrogen oxides:

[A] First catalyst: silver salt, and

Second catalyst: silver salt and copper or copper oxide.

[B] First catalyst: silver salt,

Second catalyst: silver salt and copper or copper oxide, and

Third catalyst: Pt, Au, etc.

[C] First catalyst: silver salt, and

Second catalyst: Pt, Au, etc.

The nitrogen oxides are removed from an exhaust gas by bringing the exhaust gas into contact with the above exhaust gas cleaner, and by using hydrocarbons remaining in the exhaust gas and/or hydrocarbons and/or oxygen-containing organic compounds added to the exhaust gas on the upstream side of the exhaust gas cleaner as reducing agents.

Each exhaust gas cleaner may be basically in two structures; one in which each of two or more catalysts is composed of a catalytically active component carried by porous inorganic oxide powder, which is in turn supported on an exhaust gas cleaner substrate, and the other in which each of two or more catalysts is composed of a catalytically active component directly carried by a porous inorganic oxide body.

In the former exhaust gas cleaner, the catalysts comprising catalytically active components supported on a porous inorganic oxide powder are coated onto a heat-resistant exhaust gas cleaner substrate. Preferable materials for the exhaust gas cleaner substrate include porous, heat-resistant ceramics such as γ-alumina, titania, zirconia and their composite oxides such as γ-alumina-titania, γ-alumina-silica, γ-alumina-zirconia, titania-zirconia, etc. When a high heat resistance is required, cordierite, mullite, alumina or its composite oxides are preferable. Also, the exhaust gas cleaner substrate may be formed from a known metal material.

The shape and size of the exhaust gas cleaner substrate may be changed depending on applications. Practically, it is preferable to form the exhaust gas cleaner substrate by a combination of two parts or more. Specifically, in the case of two parts, there are an inlet portion and an outlet portion. Also, in the case of three parts, there are an inlet portion, an intermediate portion and an outlet portion. The exhaust gas cleaner substrate may be in the form of a three-dimensional structure such as a honeycomb, a foam, a refractory fiber assembly, etc.

In the latter exhaust gas cleaner, the catalytically active components are supported directly by porous inorganic oxide bodies in the form of pellets or granules, and they are charged into a proper reactor such as a catalytic converter.

[A] First type of exhaust gas cleaner and method of removing NOx by using such exhaust gas cleaner The first type of exhaust gas cleaner comprises a first catalyst comprising 0.2–15 weight % (on a metal basis) of at least one silver salt supported on a porous inorganic oxide, and a second catalyst comprising (a) 0.2–15 weight % (on a metal basis) of at least one silver salt and (b) up to 2 weight % (on a metal basis) of copper or copper oxide supported on a porous inorganic oxide. The first catalyst is disposed on the inlet side of the exhaust gas cleaner, and the second catalyst is disposed on the outlet side of the exhaust gas cleaner.

[1] First catalyst

The first catalyst is at least one silver salt supported on a porous inorganic oxide, which is disposed on the inlet side of the exhaust gas cleaner. The silver salt may include silver halides, silver sulfate and silver phosphate. Preferable silver salts are silver chloride and silver sulfate, and more preferable silver salt is silver chloride. Preferable materials for the porous inorganic oxide include ceramics such as alumina, silica, titania, zirconia and their composite oxides, etc. Particularly preferable materials for the porous inorganic oxide are γ-alumina or its composite oxide such as γ-alumina-titania, γ-alumina-silica, γ-alumina-zirconia, etc. With γ-alumina or its composite oxides, the hydrocarbons remaining in the exhaust gas and/or at least one reducing agent selected from hydrocarbons and oxygen-containing organic compounds added to the exhaust gas are efficiently reacted with the nitrogen oxides in the exhaust gas.

A specific surface area of the porous inorganic oxide is preferably 10 $m^2/g$ or more. When the specific surface area is smaller than 10 $m^2/g$, the catalytically active component supported on a porous inorganic oxide does not come into contact with the exhaust gas in a large contact area, failing to remove nitrogen oxides efficiently. A specific surface area of the porous inorganic oxide is more preferably 30 $m^2/g$ or more.

The amount of the silver salt supported as a catalytically active component by the porous inorganic oxide is 0.2–15 weight %, preferably 0.5–10 weight % (on a metal basis) based on the porous inorganic oxide (100 weight %). When the amount of the silver salt is less than 0.2 weight %, a removal ratio of nitrogen oxides is low. On the other hand, when the amount of the silver salt is more than 15 weight %, hydrocarbons are likely to be predominantly burned, resulting in a decrease in the removal ratio of nitrogen oxides.

The silver salt component may be carried by the porous inorganic oxide by known methods such as an impregnation method, a precipitation method, a kneading method, etc. In the case of the impregnation method, for example, the porous inorganic oxide is impregnated with an aqueous solution of silver nitrate, etc., dried at 50°–120° C., further impregnated with an aqueous solution of ammonium halide to convert the silver nitrate into silver halide, etc., dried at 50°–150° C., and calcined while elevating a temperature stepwise from about 100° C. to about 600° C. The calcination may be conducted in the air, in an oxygen or nitrogen atmosphere, or in a hydrogen stream. When the calcination is conducted in a nitrogen atmosphere or in a hydrogen stream, it is preferable to finally conduct an oxidation treatment, more preferably in the presence of a small amount of nitrogen oxide.

The average diameter of the silver salt component after calcination is preferably 10–1000 nm. The smaller the average diameter of the silver salt component, the higher the reactivity of the first catalyst. When the average diameter of the silver salt component is less than 10 nm, hydrocarbons and/or oxygen-containing organic compounds are likely to be predominantly burned, resulting in a decrease in the removal ratio of nitrogen oxides. On the other hand, when it is larger than 1000 nm, the reactivity of the silver salt component is low, resulting in a low removal ratio of nitrogen oxides. The average diameter of the silver salt component is more preferably 10–500 nm, and most preferably 10–200 nm. Incidentally, the average diameter is determined arithmetically.

The first catalyst may be carried by the exhaust gas cleaner substrate by known methods such as a wash-coating method, a powder method, etc. The thickness of the first catalyst carried by the exhaust gas cleaner substrate is preferably 300 μm or less, more preferably 200 μm or less, though it is usually restricted by the difference in a thermal expansion coefficient between the first catalyst and the substrate. With this thickness, it is possible to prevent the exhaust gas cleaner from being broken by a thermal shock, etc. during NOx-removing operations.

The amount of the first catalyst coated onto a surface of the exhaust gas cleaner substrate is preferably 20–250 g/liter, more preferably 50–200 g/liter based on the exhaust gas cleaner substrate. When the amount of the first catalyst is less than 20 g/liter, a sufficient removal ratio of nitrogen oxides cannot be achieved. On the other hand, even when the amount of the first catalyst is more than 250 g/liter, correspondingly higher removal efficiency cannot be obtained, only resulting in a higher loss of pressure.

[2] Second catalyst

The second catalyst comprises at least one silver salt selected from the group consisting of silver halides, silver sulfate and silver phosphate and copper or copper oxide supported as catalytically active components by a porous inorganic oxide, which is disposed on the outlet side of the exhaust gas cleaner. As in the first catalyst, the preferable materials for the porous inorganic oxide include porous, heat-resistant ceramics such as γ-alumina, silica, titania, zirconia and their composite oxides such as γ-alumina-titania, γ-alumina-silica, γ-alumina-zirconia, titania-zirconia, etc. As in the first catalyst, a specific surface area of the porous inorganic oxide is preferably 10 m$^2$/g or more, more preferably 30 m$^2$/g or more.

The catalytically active components of the second catalyst are a mixture of (a) at least one silver salt selected from the group consisting of silver halides, silver sulfate and silver phosphate and (b) copper or copper oxide. The amount of the silver salt is 0.2–15 weight %, preferably 0.5–10 weight %, (on a metal basis) based on the porous inorganic oxide. When the amount of the silver salt is less than 0.2 weight % or exceeds 15 weight %, a removal ratio of nitrogen oxides is low. The amount of copper or copper oxide is up to 2 weight %, preferably up to 1.5 weight %, (on a metal basis) based on the porous inorganic oxide. When it exceeds 2 weight %, a removal ratio of nitrogen oxides is lowered.

The total amount of the catalytically active components (a) and (b) in the second catalyst is more than 0.2 weight % and not more than 17 weight % (on a metal basis), preferably 0.5–15 weight % (on a metal basis) based on the porous inorganic oxide. When the total amount of the catalytically active components exceeds 17 weight %, hydrocarbons are likely to be predominantly burned, resulting in a decrease in the removal ratio of nitrogen oxides. On the other hand, when it is lower than 0.2 weight %, the removal ratio of nitrogen oxides is low in a low-temperature region.

The second catalyst may further contain (c) at least one alkali metal element and at least one rare earth element. The alkali metal element may be Na, K or Cs, and the rare earth element may be La, Ce or Nd. A Misch metal, a mixture of two or more rare earth elements, may also be used. In a case where the alkali metal element and the rare earth element are combinedly used in the second catalyst, the total amount of the alkali metal element and the rare earth element is preferably 2 weight % or less (on a metal basis), more preferably 0.5–1.5 weight % (on a metal basis). Further, the amount of the alkali metal element is preferably 1 weight % or less, more preferably 0.1–0.5 weight %, and the amount of the rare earth element is preferably 1 weight % or less, more preferably 0.1–0.5 weight %.

The total amount of the catalytically active components (a), (b) and (c) in the second catalyst is more than 0.2 weight % and not more than 19 weight % (on a metal basis), preferably 0.5–15 weight % (on a metal basis) based on the porous inorganic oxide. When the total amount of the catalytically active components is lower than 0.2 weight %, no remarkable effect is exerted, resulting in a decrease in the removal ratio of nitrogen oxides. On the other hand, when it exceeds 19 weight %, hydrocarbons are predominantly burned to reduce the removal ratio of nitrogen oxides.

The catalytically active components of the second catalyst may be carried by the porous inorganic oxide by known methods such as an impregnation method, a precipitation method, etc. In the case of the impregnation method, after carrying silver halide, etc. in the same method as in the first catalyst, the porous inorganic oxide is impregnated with an aqueous solution of copper nitrate, etc., dried at 50°–150° C., and heated at a temperature elevating stepwise from 100° C. to 600° C. The heating may be conducted in the air or in a nitrogen or hydrogen stream as in the first catalyst. Incidentally, the catalytically active components (b) and (c) supported on the porous inorganic oxide are expressed herein by metals per se for the sake of simplicity, though they may exist in the form of metal or oxide at an exhaust gas temperature.

The thickness of the second catalyst carried by the exhaust gas cleaner substrate is preferably 200 μm or less, more preferably 100 μm or less. The amount of the second catalyst carried by the substrate is preferably 20–250 g/liter, more preferably 50–200 g/liter based on the substrate. Incidentally, the second catalyst may be carried by the exhaust gas cleaner substrate by known methods such as a wash-coating method, etc.

A weight ratio of the first catalyst to the second catalyst is 5:1 to 1:5. When the weight ratio of the first catalyst to the second catalyst is less than 1:5 (when the percentage of the first catalyst is too small), a sufficiently high removal ratio of nitrogen oxides cannot be achieved in a wide temperature range of 200°–600° C. On the other hand, when the weight ratio is higher than 5:1 (when the percentage of the first catalyst is too large), a high removal ratio of nitrogen oxides cannot be achieved at a temperature of 400° C. or lower. Namely, a reaction of the reducing agents with nitrogen oxides does not proceed well at a relatively low temperature. The more preferred weight ratio of the first catalyst to the second catalyst is 4:1 to 1:4.

[3] Method for removing NOx by using exhaust gas cleaner (first type)

The exhaust gas cleaner is disposed in a flow path of the exhaust gas, with the first catalyst on the inlet side and the second catalyst on the outlet side.

The exhaust gas usually contains residual hydrocarbons such as ethylene, propylene, etc. to some extent. Since the exhaust gas generally does not contain sufficient amounts of residual hydrocarbons to reduce all nitrogen oxides in the exhaust gas, at least one reducing agent selected from hydrocarbons and oxygen-containing organic compounds should be introduced into the exhaust gas. A site for introducing the reducing agent is an upstream side of the exhaust gas cleaner.

The hydrocarbons which are introduced into the exhaust gas may be gaseous or liquid in the normal state. The gaseous hydrocarbons may be alkanes, alkenes or alkynes having 2 or more carbon atoms, such as propane, propylene, acetylene, etc., and the liquid hydrocarbons may be diesel oil, cetane, heptane, kerosene, etc. The preferred oxygen-containing organic compounds are alcohols such as ethanol, butanol, etc. These reducing agents can be introduced into the exhaust gas by a spray method, etc.

A weight ratio of the reducing agent introduced into the exhaust gas to nitrogen oxides existing in the exhaust gas is preferably 0.1–5. When the weight ratio is less than 0.1, a removal ratio of nitrogen oxides is low. On the other hand, when the weight ratio is more than 5, fuel efficiency is low. The weight ratio is more preferably 0.2 to 4.

The reaction of the nitrogen oxides with the hydrocarbons and/or the oxygen-containing organic compounds is efficiently carried out by controlling a catalyst ratio which means a ratio of the amount of the above-mentioned catalyst to the amount of the exhaust gas per a unit time (catalyst amount/(exhaust gas amount/unit time)). From a practical point of view, the catalyst ratio is preferably 0.005 sec.g/ml or more, more preferably 0.006 sec.g/ml or more.

The exhaust gas passing through the exhaust gas cleaner in which the hydrocarbons and/or the oxygen-containing organic compounds are reacted with the nitrogen oxides is kept at a temperature of 200°–600° C. When the temperature of the exhaust gas is lower than 200° C., a reduction reaction of the nitrogen oxides cannot be sufficiently carried out. On the other hand, when the temperature of the exhaust gas is higher than 600° C., the hydrocarbons and/or the oxygen-containing organic compounds are burned, failing to reduce the nitrogen oxides effectively. The preferred temperature of the exhaust gas is 300°–500° C.

By the method using the exhaust gas cleaner (first type), nitrogen oxides can be efficiently removed from the exhaust gas at a wide temperature range of 200°–600° C. even though the exhaust gas contains about 10% of moisture.

[B] Second type of exhaust gas cleaner and method of removing NOx, etc. by using such exhaust gas cleaner The second type of exhaust gas cleaner comprises a first catalyst comprising 0.2–15 weight % (on a metal basis) of at least one silver salt supported on a porous inorganic oxide, a second catalyst comprising (a) 0.2–15 weight % (on a metal basis) of at least one silver salt and (b) up to 2 weight % (on a metal basis) of copper or copper oxide supported on a porous inorganic oxide, and a third catalyst comprising up to 2 weight % (on a metal basis) of at least one element selected from the group consisting of Pt, Pd, Ru, Rh, Ir and Au supported on a porous inorganic oxide. The first, second and third catalysts are disposed in this order from the inlet side to the outlet side of the exhaust gas cleaner.

[1] First catalyst

The first catalyst of the second type of the exhaust gas cleaner may essentially be the same as that of the first type of the exhaust gas cleaner. Specifically, the first catalyst is at least one silver salt which may be selected from the group consisting of silver halides, silver sulfate and silver phosphate supported on a porous inorganic oxide, which is disposed on the inlet side of the exhaust gas cleaner to remove mainly nitrogen oxides in a high-temperature range. The materials for the porous inorganic oxide may be the same as in the first catalyst of the first type of the exhaust gas cleaner.

As in the first catalyst of the first type of the exhaust gas cleaner, the amount of the silver salt supported as a catalytically active component by the porous inorganic oxide is 0.2–15 weight % (on a metal basis), preferably 0.5–10 weight % (on a metal basis) based on the porous inorganic oxide (100 weight %).

The silver salt component may be carried by the porous inorganic oxide by the same method as in the first type of the exhaust gas cleaner. The average diameter of the silver salt component supported on the porous inorganic oxide after calcination is preferably 10–1000 nm, more preferably 10–500 nm, and most preferably 10–200 nm.

The thickness of the first catalyst carried by the exhaust gas cleaner substrate is preferably 200 μm or less, more preferably 100 μm or less. The first catalyst may be carried by the exhaust gas cleaner substrate by known methods such as a wash-coating method, etc. The amount of the first catalyst coated onto a surface of the exhaust gas cleaner substrate is preferably 20–250 g/liter, more preferably 50–200 g/liter based on the exhaust gas cleaner substrate.

[2] Second catalyst

The second catalyst of the second type of the exhaust gas cleaner may essentially be the same as that of the first type of the exhaust gas cleaner. Specifically, the second catalyst comprises (a) at least one silver salt selected from the group consisting of silver halides, silver sulfate and silver phosphate and (b) copper or copper oxide supported as catalytically active components by a porous inorganic oxide, which is disposed downstream of the first catalyst to remove mainly nitrogen oxides in a low-temperature range. The materials for the porous inorganic oxide may be the same as in the second catalyst of the first type of the exhaust gas cleaner.

The amount of the silver salt is 0.2–15 weight %, preferably 0.5–10 weight % (on a metal basis) based on the porous inorganic oxide. The amount of copper or copper oxide is up to 2 weight %, preferably up to 1.5 weight % (on a metal basis) based on the porous inorganic oxide. The total amount of the catalytically active components (a) and (b) in the second catalyst is more than 0.2 weight % and not more than 17 weight %, preferably 0.5–15 weight % (on a metal basis) based on the porous inorganic oxide.

The second catalyst may further contain (c) 1 weight % or less, preferably 0.1–0.5 weight % of at least one alkali metal element such as Na, K or Cs and 1 weight % or less, preferably 0.1–0.5 weight % of at least one rare earth element such as La, Ce or Nd. The total amount of the alkali metal element and the rare earth element may be preferably 2 weight % or less (on a metal basis), more preferably 0.5–1.5 weight % (on a metal basis).

The total amount of the catalytically active components (a), (b) and (c) in the second catalyst is more than 0.2 weight % and not more than 19 weight % (on a metal basis), preferably 0.5–15 weight % (on a metal basis) based on the porous inorganic oxide.

The catalytically active components of the second catalyst may be carried by the porous inorganic oxide by the same method as in the first type of the exhaust gas cleaner.

The thickness of the second catalyst carried by the exhaust gas cleaner substrate is preferably 200 μm or less, more preferably 100 μm or less. The amount of the second catalyst carried by the substrate is preferably 20–250 g/liter, more preferably 50–200 g/liter based on the substrate.

A weight ratio of the first catalyst to the second catalyst is preferably 5:1 to 1:5, more preferably 4:1 to 1:4.

[3] Third catalyst

The third catalyst comprises at least one element selected from the group consisting of Pt, Pd, Ru, Rh, Ir and Au supported on a porous inorganic oxide, which is disposed on the outlet side of the exhaust gas cleaner (downstream of the second catalyst). The third catalyst functions to remove nitrogen oxides in a low-temperature range, and to oxidize carbon monoxide and hydrocarbons. Preferable materials for the porous inorganic oxide may be the same as in the first catalyst.

The amount of the catalytically active component of the third catalyst is up to 2 weight % (on a metal basis), preferably 0.1–1.5 weight % (on a metal basis) based on the porous inorganic oxide. When the amount of the catalytically active component of the third catalyst exceeds 2 weight %, hydrocarbons are likely to be predominantly burned, resulting in a decrease in the removal ratio of nitrogen oxides.

When gold is added as a component of the second catalyst with or without Pt, etc., the amount of gold is 0.02–5 weight % (on a metal basis) based on the porous inorganic oxide. When the amount of gold is less than 0.02 weight %, a sufficient removal ratio of nitrogen oxides cannot be achieved. On the other hand, when it exceeds 5 weight %, hydrocarbons and/or oxygen-containing organic compounds are likely to be predominantly burned, resulting in a decrease in the removal ratio of nitrogen oxides. The preferred amount of gold is 0.02–2 weight % (on a metal basis) based on the porous inorganic oxide.

The third catalyst may further contain at least one rare earth element such as La, Ce, etc. in an amount of 10 weight % or less (on a metal basis) based on the porous inorganic oxide. With the rare earth element supported together, the third catalyst (platinum catalyst) is provided with an improved heat resistance.

The catalytically active component of the third catalyst may be carried by the porous inorganic oxide by known methods such as an impregnation method, a sol-gel method, etc. In the case of the impregnation method, the porous inorganic oxide is impregnated with an aqueous solution of chlorides, nitrates, etc. of an element for the catalytically active component, dried at 50°–150° C., and heated at a temperature elevating stepwise from 100° C. to 700° C.

The third catalyst may be carried by the exhaust gas cleaner substrate by known methods such as a wash-coating method, a sol-gel method, a powder method, etc. The thickness of the third catalyst carried by the exhaust gas cleaner substrate is preferably 200 µm or less, more preferably 100 µm or less. The amount of the third catalyst carried by the substrate is preferably 20–250 g/liter, more preferably 50–200 g/liter based on the substrate.

A weight ratio of the first catalyst to the third catalyst is preferably 5:1 to 1:5. When the weight ratio of the first catalyst to the third catalyst is less than 1:5 (when the percentage of the first catalyst is too small), a sufficiently high removal ratio of nitrogen oxides cannot be achieved in a wide temperature range of 200°–600° C. On the other hand, when the weight ratio is higher than 5:1 (when the percentage of the first catalyst is too large), high removal ratios of nitrogen oxides, carbon monoxide and hydrocarbons cannot be achieved at a temperature of 400° C. or lower. The more preferred weight ratio of the first catalyst to the third catalyst is 4:1 to 1:4.

[4] Method for removing NOx by using exhaust gas cleaner (second type)

The exhaust gas cleaner is disposed in a flow path of the exhaust gas, with the first catalyst on the inlet side, the third catalyst on the outlet side and the second catalyst interposed therebetween.

The hydrocarbons and the oxygen-containing organic compounds which are introduced into the exhaust gas as the reducing agent may be the same as in the method using exhaust gas cleaner (first type). A weight ratio of the reducing agent to nitrogen oxides existing in the exhaust gas is preferably 0.1–5, more preferably 0.2 to 4.

From a practical point of view, the catalyst ratio is preferably 0.005 sec.g/ml or more, more preferably 0.006 sec.g/ml or more.

The exhaust gas passing through the exhaust gas cleaner is kept at a temperature of 200°–600° C., preferably 300°–500° C.

By the method using the exhaust gas cleaner (second type), nitrogen oxides can be efficiently removed from the exhaust gas at a wide temperature range of 200°–600° C. even though the exhaust gas contains about 10% of moisture.

[C] Third type of exhaust gas cleaner and method of removing NOx by using such exhaust gas cleaner The third type of exhaust gas cleaner comprises a first catalyst comprising 0.2–15 weight % (on a metal basis) of at least one silver salt selected from the group consisting of silver halides, silver sulfate and silver phosphate having an average diameter of 10–1000 nm and supported on a porous inorganic oxide, and a second catalyst comprising 0.02–5 weight % (on a metal basis) of at least one element selected from the group consisting of Pt, Pd, Ru, Rh, Ir and Au supported on a porous inorganic oxide.

In one embodiment, the first catalyst is disposed on the inlet side of the exhaust gas cleaner, and the second catalyst is disposed on the outlet side of the exhaust gas cleaner. Also, in another embodiment, a mixture of the first catalyst and the second catalyst is used.

When Au is used together with Pt, etc., in one embodiment, the first catalyst is disposed on the inlet side of the exhaust gas cleaner, Au is disposed in an intermediate portion of the exhaust gas cleaner, and the second catalyst (Pt, etc.) is disposed on the outlet side of the exhaust gas cleaner. In another embodiment, a mixture of the first catalyst, Au and the second catalyst (Pt, etc.) is used.

[1] First catalyst

The first catalyst of the third type of the exhaust gas cleaner may essentially be the same as that of the first type of the exhaust gas cleaner. Specifically, the first catalyst is at least one silver salt selected from the group consisting of silver halides, silver sulfate and silver phosphate supported on a porous inorganic oxide. The materials for the porous inorganic oxide may be the same as in the first catalyst of the first type of the exhaust gas cleaner.

As in the first catalyst of the first type of the exhaust gas cleaner, the amount of the silver salt supported as a catalytically active component by the porous inorganic oxide is 0.2–15 weight % (on a metal basis), preferably 0.5–10 weight % (on a metal basis) based on the porous inorganic oxide (100 weight %).

The silver salt component may be carried by the porous inorganic oxide by the same method as in the first type of the exhaust gas cleaner. The average diameter of the silver salt component supported on the porous inorganic oxide after calcination is preferably 10–1000 nm, more preferably 10–500 nm, and most preferably 10–200 nm.

The thickness of the first catalyst carried by the exhaust gas cleaner substrate is preferably 200 µm or less, more preferably 100 µm or less. The first catalyst may be carried by the exhaust gas cleaner substrate by known methods such as a wash-coating method, etc.

The amount of the first catalyst coated onto a surface of the exhaust gas cleaner substrate is preferably 20–250 g/liter, more preferably 50–200 g/liter based on the exhaust gas cleaner substrate.

[2] Second catalyst

The second catalyst may be the same as the third catalyst of the second type of the exhaust gas cleaner. Specifically, the catalytically active component of the second catalyst is at least one element selected from the group consisting of Pt, Pd, Ru, Rh, Ir and Au, and preferable combinations thereof are Pt+Rh, Pd+Rh, and Pt+Pd+Rh. The amount of the catalytically active component of the second catalyst is 0.02–5 weight % (on a metal basis), preferably 0.05–2 weight % based on the porous inorganic oxide. When gold is added as a third component with or without Pt, etc., the amount of gold is 0.02–5 weight %, preferably 0.05–1 weight % (on a metal basis) based on the porous inorganic oxide.

The second catalyst may further contain at least one rare earth element such as La, Ce, etc. in an amount of 10 weight % or less (on a metal basis) based on the porous inorganic oxide. With the rare earth element supported together, the second catalyst (platinum catalyst) is provided with an improved heat resistance.

When gold is added as a component of the second catalyst with or without Pt, etc., the second catalyst may further contain at least one alkaline earth metal element such as Ca, Mg, etc., and at least one rare earth element such as La, Ce, etc. The amount of the alkaline earth metal element is preferably 2 weight % or less, more preferably 0.01–1 weight %, and the amount of the rare earth element is preferably 2 weight % or less, more preferably 0.01–1 weight %.

The catalytically active component of the second catalyst may be carried by the porous inorganic oxide by the same method as in the third catalyst of the second type of the exhaust gas cleaner. When gold is used, it is preferably carried by a porous inorganic oxide such as titania, zinc oxide, magnesium oxide, alumina and composite oxides thereof.

The second catalyst may be carried by the exhaust gas cleaner substrate by known methods such as a wash-coating method, a sol-gel method, a powder method, etc. The thickness of the second catalyst carried by the exhaust gas cleaner substrate is preferably 200 μm or less, more preferably 100 μm or less. The amount of the second catalyst carried by the substrate is preferably 20–250 g/liter, more preferably 50–200 g/liter based on the substrate.

A weight ratio of the first catalyst to the second catalyst is preferably 5:1 to 1:5, more preferably 4:1 to 1:4.

[3] Method for removing NOx by using exhaust gas cleaner (third type)

In one embodiment, the exhaust gas cleaner (third type) is disposed in a flow path of the exhaust gas, with the first catalyst on the inlet side and the second catalyst on the outlet side. In another embodiment, the exhaust gas cleaner comprising a mixture of the first catalyst and the second catalyst is disposed in a flow path of the exhaust gas.

The hydrocarbons or the oxygen-containing organic compounds which are introduced into the exhaust gas as the reducing agent in this method may be the same as in the method using exhaust gas cleaner (second type). The weight ratio of the reducing agent to nitrogen oxides existing in the exhaust gas is preferably 0.1–5, more preferably 0.2–4.

From a practical point of view, the catalyst ratio is preferably 0.005 sec.g/ml or more, more preferably 0.006 sec.g/ml or more.

The exhaust gas passing through the exhaust gas cleaner is kept at a temperature of 150°–650° C. When the temperature of the exhaust gas is lower than 150° C., a reduction reaction of the nitrogen oxides cannot be sufficiently carried out. On the other hand, when the temperature of the exhaust gas is higher than 650° C., the hydrocarbon or oxygen-containing organic compounds are burned, failing to reduce the nitrogen oxides effectively. The preferred temperature of the exhaust gas is 300°–600° C.

[4] Method for removing NOx from exhaust gas discharged from engines operated by liquefied petroleum gas, etc.

The third type of exhaust gas cleaner is also effective to remove nitrogen oxides from an exhaust gas discharged from engines operated by using as a fuel mixed hydrocarbons of liquefied petroleum gas, town gas or liquefied natural gas.

The third type of exhaust gas cleaner is disposed in a flow path of the exhaust gas with the first catalyst on the inlet side and the third catalyst on the outlet side, or a mixture of the first catalyst and the third catalyst is disposed in a flow path.

In this case, mixed hydrocarbons or hydrocarbons are introduced into the exhaust gas. The hydrocarbons may include alkanes, alkenes or alkynes such as methane, ethane, propane, butane, etc., and the mixed hydrocarbons may include liquefied petroleum gas, town gas and liquefied natural gas. Other mixed hydrocarbons may also be used. With the mixed hydrocarbons and the hydrocarbons, the removal ratio of NOx in a high-temperature range can be improved. When the mixed hydrocarbons are added, it is preferable to use those having many carbon atoms since saturated hydrocarbons having a small number of carbon atoms serve to decrease the removal ratio of NOx in a low-temperature range.

A weight ratio of the mixed hydrocarbons or the hydrocarbons introduced into the exhaust gas to nitrogen oxides existing in the exhaust gas is 5 or less, preferably 0.1–5, more preferably 0.2–4.

The exhaust gas passing through the exhaust gas cleaner is kept at a temperature of 150°–650° C., preferably 300°–600° C.

By the method using the exhaust gas cleaner (third type) and using the oxygen-containing organic compounds, nitrogen oxides can be efficiently removed from the exhaust gas at a wide temperature range even though the exhaust gas contains about 10% of moisture.

Though the first to third types of the exhaust gas cleaners are explained separately for the sake of avoiding confusion, it should be noted that materials and methods described with respect to a particular type of exhaust gas cleaner may be utilized for other exhaust gas cleaners unless they do not deviate from the spirit of the present invention. For instance, with respect to the details of catalysts and porous inorganic oxides, please refer to Section [A].

The present invention will be described in further detail by way of the following Examples. Incidentally, the catalytic active components are generally expressed by metals themselves for simplicity in Examples.

EXAMPLE 1

Commercially available γ-alumina pellets (diameter: 1.5 mm, length: 6 mm, specific surface area: 260 m²/g) were immersed in an aqueous solution of silver nitrate (0.67 g of silver nitrate/20 ml of water) for 20 minutes, dried at 80° C. for 2 hours, and then further dried at 180° C. for 2 hours in a dry nitrogen stream. After cooling to room temperature in a dry nitrogen stream, the γ-alumina pellets were immersed in an aqueous solution of ammonium chloride (0.5 g of ammonium chloride/20 ml of water) for 12 hours to convert the silver nitrate on the γ-alumina pellets into silver chloride. The γ-alumina pellets were then dried at 80° C. for 2 hours in air, heated to 550° C. at a heating rate of 2.5° C./min, and calcined at 550° C. for 5 hours in an nitrogen stream containing 10 % of oxygen to prepare a first catalyst (silver-salt catalyst) carrying 2 weight % (on a metal basis) of silver chloride.

Separately, γ-alumina pellets carrying thereon 2 weight (on a metal basis) of silver chloride were prepared in the same manner. The γalumina pellets thus prepared were then immersed in an aqueous solution of copper nitrate, dried and then heated to 600° C. stepwise in the air to prepare a second catalyst (silver-salt/copper catalyst) carrying 2 weight % (on a metal basis) of silver chloride and 0.07 weight % (on a metal basis) of copper.

An exhaust gas cleaner consisting of 3.75 g of the first catalyst (silver-salt catalyst) and 3.75 g of the second catalyst (silver-salt/copper catalyst) was charged into a reactor pipe with the silver salt catalyst on the inlet side and the silver-salt/copper catalyst on the outlet side.

Next, a test gas having the composition shown in Table 1 below was caused to pass through the reactor pipe at a rate of 4.4 liters per minute (normal state), which corresponded to an overall apparent space velocity of 15,000 $h^{-1}$ and catalyst ratios of the first and second catalysts of 0.05 sec.g/ml. The temperature of the test gas was kept at 250° C. in the reactor pipe to cause a reaction between nitrogen monoxide and propylene. The test was repeated while changing the temperature of the test gas as shown in FIG. 1.

TABLE 1

| Component | Concentration |
| --- | --- |
| Nitrogen monoxide | 800 ppm |
| Oxygen | 10 volume % |
| Propylene | 1714 ppm |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in FIG. 1.

EXAMPLE 2

In the same manner as in Example 1, γ-alumina powder (average diameter: 40 μm, specific surface area: 200 $m^2/g$) carrying 3 weight % (on a metal basis) of silver chloride was prepared. Then, 1.4 g of the resulting first catalyst (silver-salt catalyst) was supported on a commercially available honeycomb-type cordierite filter (diameter: 30 mm, length: 12.5 mm) by a wash-coating method, dried and then heated to 600° C. to prepare an exhaust gas cleaner part carrying the silver-salt catalyst.

Further, in the same manner as in Example 1, γ-alumina powder (average diameter: 40 μm, specific surface area: 200 $m^2/g$) carrying thereon 3 weight % (on a metal basis) of silver chloride and 0.09 weight % (on a metal basis) of copper was prepared (second catalyst). Then, 1.4 g of the second catalyst was supported on a honeycomb-type cordierite filter of the same type as above, dried and then heated to 600° C. stepwise to prepare an exhaust gas cleaner part carrying the silver-salt/copper catalyst.

With the silver-salt catalyst on the inlet side and the silver-salt/copper catalyst on the outlet side, the catalyst-carrying honeycomb-type cordierite filters were combined and charged in a reactor pipe. Under the same conditions as in Example 1, tests were conducted using the test gas having the composition shown in Table 1. The results are shown in FIG. 1.

Comparative Example 1

In the same manner as in Example 1, an exhaust gas cleaner comprising γ-alumina pellets carrying 2 weight % (on a metal basis) of silver chloride was prepared. 7.50 g of this exhaust gas cleaner was charged in a reactor pipe, and tests were conducted using the test gas having the composition shown in Table 1 under the same conditions as in Example 1. The results are shown in FIG. 1.

As is clear from FIG. 1, the exhaust gas cleaners in Examples 1 and 2 which comprise both of the silver-salt catalyst and the silver-salt/copper catalyst can provide a high removal ratio of nitrogen oxides in a wide temperature range of the exhaust gas. On the other hand, the exhaust gas cleaner in Comparative Example 1 which comprises only the silver-salt catalyst shows a low removal ratio of nitrogen oxides in a low-temperature range of the exhaust gas.

EXAMPLE 3

A first catalyst (silver-salt catalyst) carrying 2 weight % (on a metal basis) of silver chloride was prepared by carrying silver chloride on commercially available γ-alumina pellets (diameter: 1.5 mm, length: 6 mm, specific surface area: 200 $m^2/g$) in the same manner as in Example 1, drying and then heating them to 600° C. stepwise. A second catalyst (silver-salt/copper catalyst) carrying 2 weight % (on a metal basis) of silver chloride and 0.07 weight % (on a metal basis) of copper was prepared by carrying silver chloride and copper on γ-alumina pellets (diameter: 1.5 mm, length: 6 mm, specific surface area: 200 $m^2/g$) in the same manner as in Example 1, drying and then heating them to 600° C.

Further, γ-alumina pellets (diameter: 1.5 mm, length: 6 mm, specific surface area: 200 $m^2/g$) were immersed in an aqueous solution of chloroplatinic acid, dried and then heated to 700° C. to prepare a third catalyst (platinum catalyst) carrying 0.2 weight % (on a metal basis) of Pt.

An exhaust gas cleaner consisting of 3.75 g of the first catalyst (silver-salt catalyst), 3.75 g of the second catalyst (silver-salt/copper catalyst) and 1.8 g of the third catalyst (platinum catalyst) was charged into a reactor pipe with the silver-salt catalyst on the inlet side, the platinum catalyst on the outlet side and the silver-salt/copper catalyst interposed therebetween.

Next, a test gas having the composition shown in Table 2. below was caused to pass through the reactor pipe at a rate of 4.4 liters per minute (normal state), which corresponded to an overall apparent space velocity of 12,000 $h^{-1}$ and catalyst ratios of the first and third catalysts of 0.05 sec.g/ml and 0.025 sec.g/ml, respectively. The temperature of the test gas was kept at 250° C. in the reactor pipe to cause a reaction between nitrogen monoxide and propylene. The test was repeated while changing the temperature of the test gas as shown in Table 3.

TABLE 2

| Component | Concentration |
| --- | --- |
| Nitrogen monoxide | 800 ppm |
| Carbon monoxide | 100 ppm |
| Oxygen | 10 volume % |
| Propylene | 1714 ppm (three times the weight of nitrogen monoxide) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. Similarly, the removal ratios of carbon monoxide and hydrocarbons were determined. The results are shown in Table 3.

EXAMPLE 4

In the same manner as in Example 2, γ-alumina powder (specific surface area: 200 m²/g) carrying 2 weight % (on a metal basis) of silver chloride was prepared. Then, 1 g of the resulting first catalyst (silver-salt catalyst) was supported on a commercially available honeycomb-type cordierite filter (diameter: 20 mm, length: 12.6 mm, 400 cell/in²) in the same manner as in Example 2 to prepare an exhaust gas cleaner part carrying the silver-salt catalyst.

Further, in the same manner as in Example 2, γ-alumina powder (specific surface area: 200 m²/g) carrying thereon 2 weight % (on a metal basis) of silver chloride and 0.07 weight % (on a metal basis) of copper was prepared (second catalyst). Then, 1 g of the resulting second catalyst (silver-salt/copper catalyst) was supported on a honeycomb-type cordierite filter (diameter: 20 mm, length: 12.6 mm) in the same manner as in Example 2 to prepare an exhaust gas cleaner part carrying the silver-salt/copper catalyst.

Further, in the same manner as in Example 3, γ-alumina powder (specific surface area: 200 m²/g) carrying thereon 0.2 weight % (on a metal basis) of Pt and 0.2 weight % (on a metal basis) of Rh was prepared (third catalyst). Then, 0.5 g of the third catalyst was supported on a honeycomb-type cordierite filter (diameter: 20 mm, length: 6 mm) in the same manner as in Example 2 to prepare an exhaust gas cleaner part carrying the platinum/rhodium catalyst.

With the silver-salt catalyst on the inlet side, the silver-salt/copper catalyst in an intermediate portion and the platinum/rhodium catalyst on the outlet side, these exhaust gas cleaner parts were combined and charged in a reactor pipe. Under the same conditions (overall apparent space velocity: 12,000 h$^{-1}$) as in Example 3, tests were conducted using the test gas having the same composition as in Table 2 except for containing diesel oil in an amount three times that of nitrogen monoxide instead of propylene. The results are shown in Table 3.

Comparative Example 2

In the same manner as in Example 3, an exhaust gas cleaner composed of γ-alumina pellets carrying 2 weight % (on a metal basis) of silver chloride was prepared. 7.50 g of this exhaust gas cleaner was charged in a reactor pipe, and tests were conducted using the test gas having the composition shown in Table 2 under the same conditions as in Example 3. The results are shown in Table 3.

TABLE 3

Removal Ratios of Nitrogen Oxides, Carbon Monoxide and Hydrocarbons

| Temperature (20 C.) | Components Removed | Example 3 | Removal Ratio (%) Example 4 | Com. Ex. 2 |
|---|---|---|---|---|
| 250 | NOx | 30 | 25 | 0 |
|  | CO | 75 | 78 | 40 |
|  | HC* | 50 | 52 | 35 |
| 300 | NOx | 42 | 43 | 8 |
|  | CO | 90 | 90 | 50 |
|  | HC* | 65 | 70 | 40 |
| 400 | NOx | 64 | 54 | 35 |
|  | CO | 98 | 100 | 60 |
|  | HC* | 95 | 95 | 65 |
| 500 | NOx | 70 | 72 | 68 |
|  | CO | 100 | 100 | 70 |
|  | HC* | 100 | 100 | 75 |
| 550 | NOx | 74 | 78 | 72 |
|  | CO | 100 | 100 | 75 |
|  | HC* | 100 | 100 | 80 |

Note *: Hydrocarbon.

As is clear from Table 3, the exhaust gas cleaners in Examples 3 and 4 which comprise the first to third catalysts can provide high removal ratios of nitrogen oxides, carbon monoxide and hydrocarbon in a wide temperature range of the exhaust gas. On the other hand, the exhaust gas cleaner in Comparative Example 2 which comprises only the silver-salt catalyst is effective for the removal of nitrogen oxides, carbon monoxide and hydrocarbons in a narrow temperature range of the exhaust gas.

EXAMPLE 5

The exhaust gas cleaner prepared in Example 2 was charged into a reactor pipe with the silver-salt catalyst on the inlet side and the silver-salt/copper catalyst on the outlet side. Next, a test gas having the composition shown in Table 4 below was caused to pass through the reactor pipe at an overall apparent space velocity of 15,000 h$^{-1}$. The temperature of the test gas was kept at 250° C. in the reactor pipe to cause a reaction between nitrogen monoxide and ethanol. The test was repeated while changing the temperature of the test gas as shown in Table 5.

TABLE 4

| Component | Concentration |
|---|---|
| Nitrogen monoxide | 800 ppm (dry base) |
| Carbon dioxide | 10 volume % (dry base) |
| Oxygen | 10 volume % (dry base) |
| Ethanol | three times the weight of nitrogen monoxide (dry base) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in Table 5.

EXAMPLE 6

The exhaust gas cleaners prepared in Example 4 was charged into a reactor pipe with the silver-salt catalyst on the inlet side, the silver-salt/copper catalyst in an intermediate portion and the platinum/rhodium catalyst on the outlet side. Under the same conditions (overall apparent space velocity: 12,000 h$^{-1}$) as in Example 5, tests were conducted using the test gas having the composition shown in Table 4. The results are shown in Table 5.

Comparative Example 3

The exhaust gas cleaner prepared in Comparative Example 1 was charged into a reactor pipe in the same manner as in Comparative Example 1. Under the same conditions (overall apparent space velocity: about 30,000 h$^{-1}$) as in Example 5, tests were conducted using the test gas having the composition shown in Table 4. The results are shown in Table 5.

TABLE 5

Removal Ratios of Nitrogen Oxides

| Temperature (°C.) | Removal Ratio (%) | | |
|---|---|---|---|
|  | Example 5 | Example 6 | Com. Ex. 3 |
| 250 | 68.0 | 72.0 | 30.0 |
| 300 | 85.8 | 89.5 | 40.2 |

TABLE 5-continued

Removal Ratios of Nitrogen Oxides

| Temperature (°C.) | Removal Ratio (%) | | |
|---|---|---|---|
| | Example 5 | Example 6 | Com. Ex. 3 |
| 350 | 90.2 | 93.0 | 60.8 |
| 400 | 70.0 | 68.0 | 72.1 |
| 450 | 58.0 | 55.5 | 75.5 |
| 500 | 50.3 | 45.4 | 62.1 |
| 550 | 45.4 | 40.0 | 55.4 |

As is clear from Table 5, the exhaust gas cleaners in Examples 5 and 6 can provide high removal ratios of nitrogen oxides in a wide temperature range of the exhaust gas, especially, in a low-temperature range of the exhaust gas, as compared with the exhaust gas cleaner in Comparative Example 3.

EXAMPLE 7

Commercially available γ-alumina pellets (diameter: 1.5 mm, length: 6 mm, specific surface area: 200 m²/g) were immersed in an aqueous solution of silver nitrate (0.67 g of silver nitrate/20 ml of water) for 20 minutes, dried at 80° C. for 2 hours, and then further dried at 180° C. for 2 hours in a dry nitrogen stream. After cooling to room temperature in a dry nitrogen stream, the γ-alumina pellets were immersed in an aqueous solution of ammonium chloride (0.5 g of ammonium chloride/20 ml of water) for 12 hours to convert the silver nitrate on the γ-alumina pellets into silver chloride. The γ-alumina pellets were then dried at 80° C. for 2 hours in air, heated to 600° C. at a heating rate of 2.5° C./min, and calcined at 600° C. for 5 hours in an nitrogen stream containing 10 % of oxygen to prepare a first catalyst (silver-salt catalyst) carrying 3 weight % (on a metal basis) of silver chloride having an average diameter of 45 nm.

Further, γ-alumina pellets (diameter: 1.5 mm, length: 6 mm, specific surface area: 200 m²/g) were immersed in an aqueous solution of chloroplatinic acid, dried and then heated to 700° C. to prepare a second catalyst (platinum catalyst) carrying 3 weight % (on a metal basis) of Pt.

An exhaust gas cleaner consisting of 3.7 g of the first catalyst (silver-salt catalyst) and 1.8 g of the second catalyst (platinum catalyst) was charged into a reactor pipe with the silver-salt catalyst on the inlet side and the platinum catalyst on the outlet side.

Figure 2:
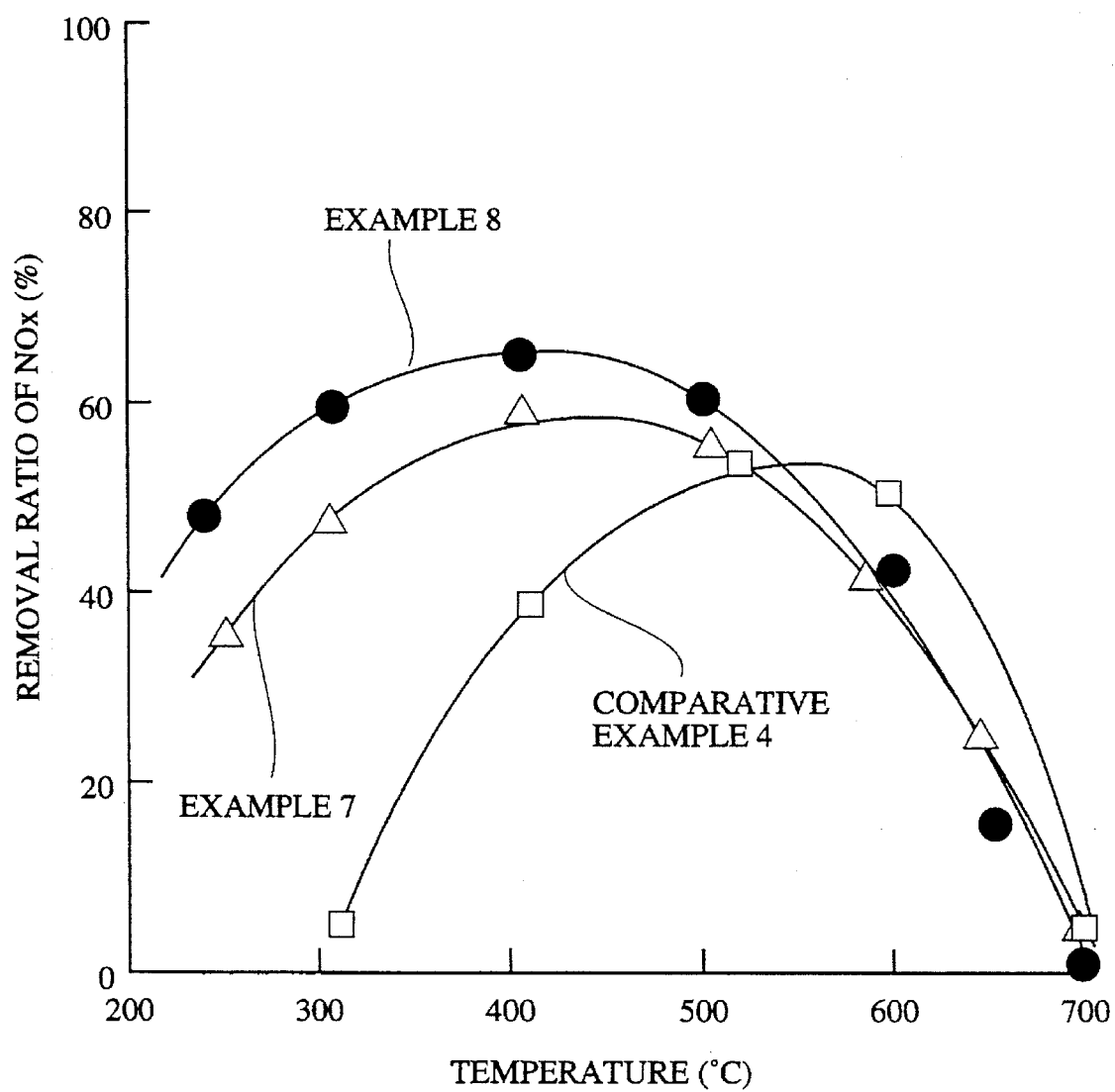
FIG. 2 is a graph showing the relation between the removal ratio of NOx and the temperature of the exhaust gas in Examples 7 and 8 and Comparative Example 4.

Next, a test gas having the composition shown in Table 6 below was caused to pass through the reactor pipe at a rate of 4.4 liters per minute (normal state), which corresponded to an overall apparent space velocity of 20,000 h⁻¹ and catalyst ratios of the first and second catalysts of about 0.05 sec.g/ml and about 0.025 sec.g/ml, respectively. The temperature of the test gas was kept at about 250° C. in the reactor pipe to cause a reaction between nitrogen monoxide and propylene. The test was repeated while changing the temperature of the test gas as shown in FIG. 2.

TABLE 6

| Component | Concentration |
|---|---|
| Nitrogen monoxide | 800 ppm |
| Carbon monoxide | 100 ppm |
| Oxygen | 10 volume % |
| Propylene | 1714 ppm |
| Nitrogen | Balance |

TABLE 6-continued

| Component | Concentration |
|---|---|
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in FIG. 2.

EXAMPLE 8

In the same manner as in Example 7, γ-alumina powder (specific surface area: 200 m²/g) carrying 5 weight % (on a metal basis) of silver chloride having an average diameter of 50 nm was prepared. 1 g of the resulting first catalyst (silver-salt catalyst) was supported on a commercially available honeycomb-type cordierite filter (diameter: 30 mm, length: 12.6 mm, 400 cells/in²) by a wash-coating method, dried and then heated to 600° C. stepwise to prepare an exhaust gas cleaner part carrying the silver-salt catalyst.

Further, in the same manner as in Example 7, γ-alumina powder (specific surface area: 200 m²/g) carrying 4 weight % (on a metal basis) of Pt was prepared. 0.4 g of the resulting second catalyst (platinum catalyst) was supported on a honeycomb-type cordierite filter (diameter: 30 mm, length: 6 mm), dried and then heated to 700° C. to prepare an exhaust gas cleaner part carrying the platinum catalyst.

With the silver-salt catalyst on the inlet side and the platinum catalyst on the outlet side, these exhaust gas cleaner parts were combined and charged in a reactor pipe. Under the same conditions as in Example 7, tests were conducted using the test gas having the same composition as in Table 6 except for containing diesel oil in an amount three times that of nitrogen monoxide instead of propylene. The results are shown in FIG. 2.

Comparative Example 4

In the same manner as in Example 7, 5.4 g of an exhaust gas cleaner composed of γ-alumina pellets carrying 5 weight % (on a metal basis) of silver chloride having an average diameter of 8 nm was charged in a reactor pipe, and tests were conducted using the test gas having the composition shown in Table 6 under the same conditions as in Example 7. The results are shown in FIG. 2.

As is clear from FIG. 2, the exhaust gas cleaners in Examples 7 and 8 can provide a high removal ratio of nitrogen oxides in a wide temperature range of the exhaust gas, while the exhaust gas cleaner in Comparative Example 4 fails to do so.

EXAMPLE 9

The exhaust gas cleaner prepared in Example 7 was charged into a reactor pipe with the silver-salt catalyst on the inlet side and the platinum catalyst on the outlet side.

Next, a test gas having the composition shown in Table 7 was caused to pass through the reactor pipe at a rate of 4.4 liters per minute (normal state), which corresponded to an overall apparent space velocity of 30,000 h⁻¹ and catalyst ratios of the first and second catalysts of about 0.038 sec.g/ml and about 0.014 sec.g/ml, respectively. The temperature of the test gas was kept at 200° C. in the reactor pipe to cause a reaction between nitrogen monoxide and ethanol.

Figure 3:
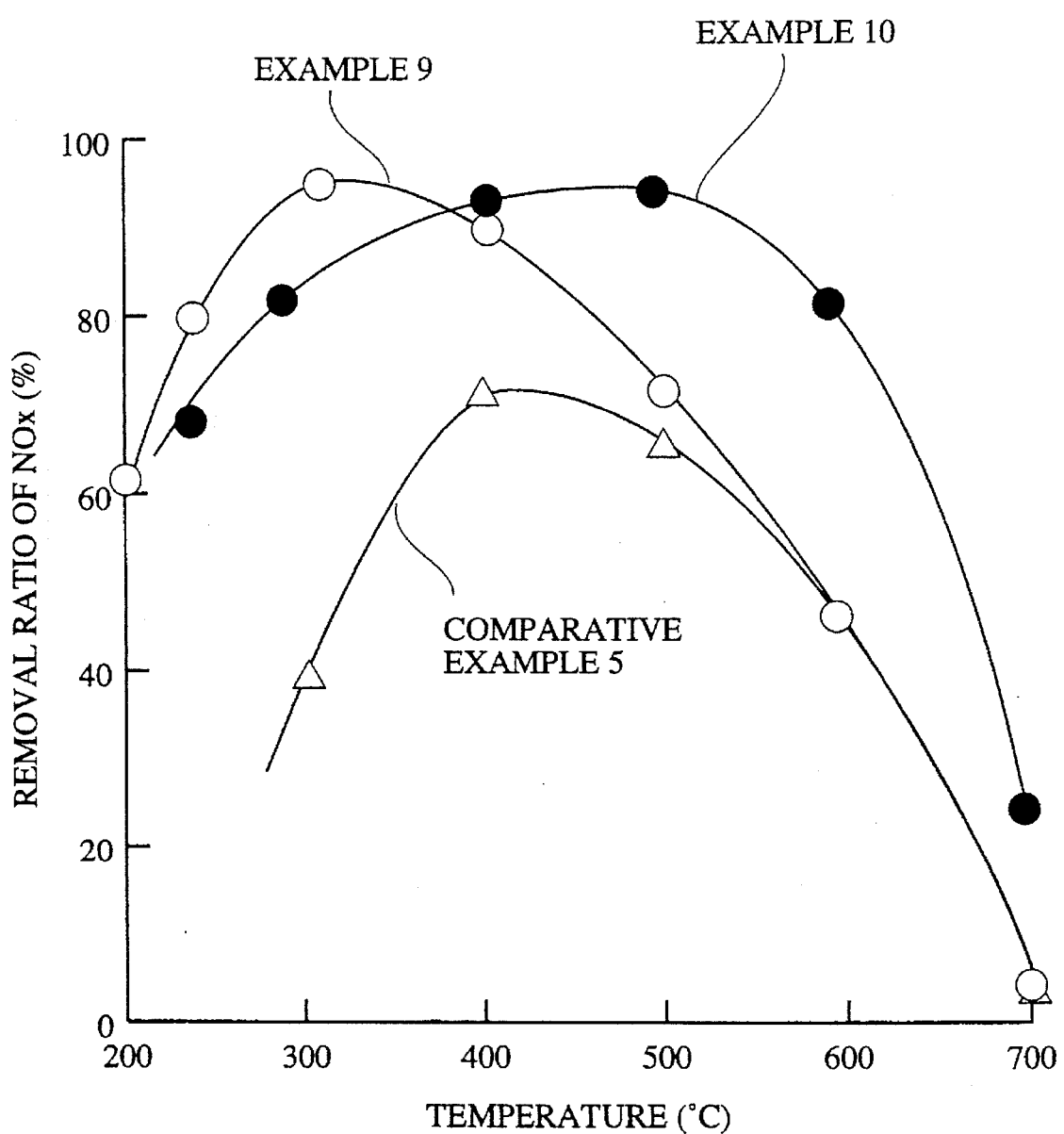
FIG. 3 is a graph showing the relation between the removal ratio of NOx and the temperature of the exhaust gas in Examples 9 and 10 and Comparative Example 5.

The test was repeated while changing the temperature of the test gas as shown in FIG. 3.

TABLE 7

| Component | Concentration |
| --- | --- |
| Nitrogen monoxide | 800 ppm |
| Carbon monoxide | 100 ppm |
| Oxygen | 10 volume % |
| Ethanol | 1600 ppm |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in FIG. 3.

EXAMPLE 10

The exhaust gas cleaner prepared in Example 8 was charged into a reactor pipe with the silver-salt catalyst on the inlet side and the platinum catalyst on the outlet side. Under the same conditions (overall apparent space velocity: 20,000 $h^{-1}$) as in Example 19, the tests were conducted using the test gas having the composition shown in Table 7. The results are shown in FIG. 3.

Comparative Example 5

In the same manner as in Example 7, an exhaust gas cleaner comprising γ-alumina pellets carrying 5 weight % (on a metal basis) of silver chloride having an average diameter of 2000 nm was prepared. 5.4 g of this exhaust gas cleaner was charged in a reactor pipe, and tests were conducted using the test gas having the composition shown in Table 7 under the same conditions as in Example 9. The results are shown in FIG. 3.

EXAMPLE 11

In the same manner as in example 7, 5 weight % (on a metal basis) of silver chloride was carried on commercially available γ-alumina pellets (diameter: 1.5 mm, length: 6 mm, specific surface area: 200 $m^2/g$). The resulting γ-alumina pellets were dried at 70° C. and calcined at 150° C., 200° C., 300° C., 400° C., 500° C., 600° C. stepwise to prepare a first catalyst (silver-salt catalyst) carrying silver chloride having an average diameter of 200 nm.

Further, γ-alumina pellets (diameter: 1.5 mm, length: 6 mm, specific surface area: 200 $m^2/g$) were immersed in an aqueous solution of chloroplatinic acid, dried and then heated to 700° C. to prepare a second catalyst (platinum catalyst) carrying 3 weight % (on a metal basis) of Pt.

An exhaust gas cleaner consisting of a mixture of 4 g of the first catalyst (silver-salt catalyst) and 2 g of the second catalyst (platinum catalyst) was charged into a reactor pipe.

Figure 4:
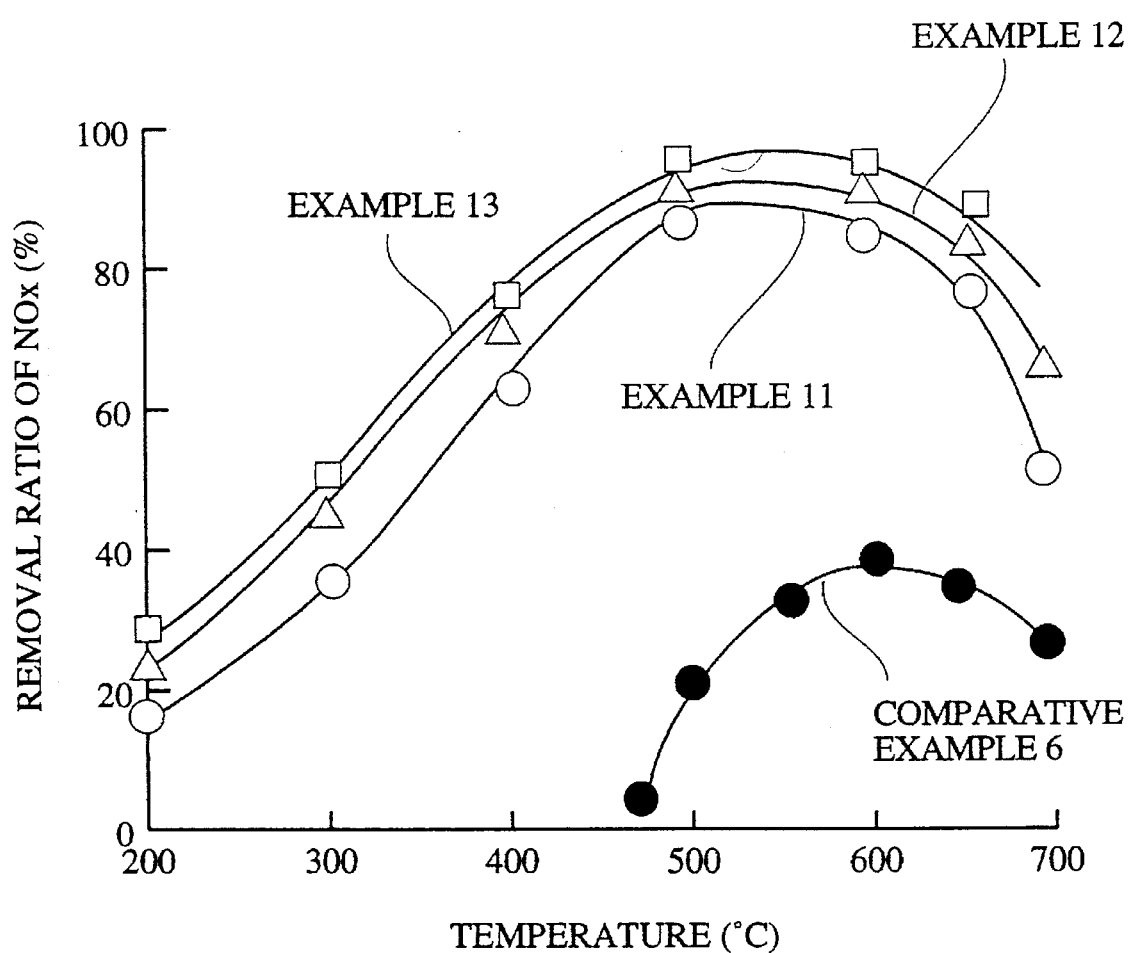
FIG. 4 is a graph showing the relation between the removal ratio of NOx and the temperature of the exhaust gas in Examples 11–13 and Comparative Example 6.

Next, a test gas having the composition shown in Table 8 was caused to pass through the reactor pipe at a rate of 2.2 liters per minute (normal state), which corresponded to an overall apparent space velocity of 10,000 $h^{-1}$ and catalyst ratios of the first and second catalysts of about 0.1 sec.g/ml and about 0.05 sec.g/ml, respectively. The temperature of the test gas was kept at 200° C. in the reactor pipe to cause a reaction between nitrogen monoxide and liquefied petroleum gas. The test was repeated while changing the temperature of the test gas as shown in FIG. 4.

TABLE 8

| Component | Concentration |
| --- | --- |
| Nitrogen monoxide | 800 ppm |
| Oxygen | 10 volume % |
| Liquefied petroleum gas | 1700 ppm |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in FIG. 4.

EXAMPLE 12

In the same manner as in Example 7, γ-alumina powder (average diameter: 40 μm, specific surface area: 200 $m^2/g$) carrying 5 weight % (on a metal basis) of silver chloride having an average diameter of 300 nm was prepared. 1 g of the resulting first catalyst (silver-salt catalyst) was supported on a commercially available honeycomb-type cordierite filter (diameter: 30 mm, length: 12.6 mm, 400 cells/$in^2$) by a wash-coating method, dried and then heated to 600° C. stepwise to prepare an exhaust gas cleaner part carrying the silver-salt catalyst.

Further, in the same manner as in Example 7, γ-alumina powder (average diameter: 40 μm, specific surface area: 200 $m^2/g$) carrying 3 weight % (on a metal basis) of Pt was prepared. 0.4 g of the resulting second catalyst (platinum catalyst) was supported on a honeycomb-type cordierite filter (diameter: 30 mm, length: 6 mm), dried and then heated to 700° C. to prepare an exhaust gas cleaner part carrying the platinum catalyst.

With the silver-salt catalyst on the inlet side and the platinum catalyst on the outlet side, these exhaust gas cleaner parts were combined and charged in a reactor pipe. Under the same conditions (an overall apparent space velocity of 10,000 $h^{-1}$) as in Example 11, tests were conducted using the test gas having the composition shown in Table 8. The results are shown in FIG. 4.

EXAMPLE 13

Under the same conditions as in Example 11, tests were conducted using the exhaust gas cleaner prepared in Example 12 and the test gas having the same composition as in Table 8 except for containing propane instead of liquefied petroleum gas.

Comparative Example 6

An exhaust gas cleaner comprising γ-alumina pellets carrying 5 weight % (on a metal basis) of silver chloride having an average diameter of 250 nm was prepared in the same as in Example 11. 10 g of this exhaust gas cleaner was charged in a reactor pipe, and tests were conducted using the test gas having the composition shown in Table 8 under the same conditions as in Example 11. The results are shown in FIG. 4.

As is clear from FIGS. 3 and 4, the exhaust gas cleaners in Examples 9–13 can provide high removal ratios of nitrogen oxides in a wide temperature range of the exhaust gas. On the other hand, the exhaust gas cleaners in Comparative Examples 5 and 6 are effective only in a narrow temperature range of the exhaust gas.

EXAMPLE 14

Commercially available γ-alumina pellets (diameter: 1.5 mm, length: 6 mm, specific surface area: 200 m²/g) were immersed in an aqueous solution of silver nitrate (0.67 g of silver nitrate/20 ml of water) for 20 minutes, dried at 80° C. for 2 hours, and then further dried at 180° C. for 2 hours in a dry nitrogen stream. After cooling to room temperature in a dry nitrogen stream, the γ-alumina pellets were immersed in an aqueous solution of ammonium chloride (0.5 g of ammonium chloride/20 ml of water) for 12 hours to convert the silver nitrate on the γ-alumina pellets into silver chloride. The γ-alumina pellets were then dried at 80° C. for 2 hours in air, heated to 550° C. at a heating rate of 2.5° C./min, and calcined at 550° C. for 5 hours in an nitrogen stream containing 10 % of oxygen to prepare a first catalyst (silver-salt catalyst) carrying 4 weight % (on a metal basis) of silver chloride having an average diameter of 200 nm.

Further, commercially available titania pellets (diameter: 1.5 mm, length: 6 mm, specific surface area: 20 m²/g) were immersed in an aqueous solution of chloroauric acid, dried and then heated to 700° C. to prepare a second catalyst (gold catalyst) carrying 1 weight % of Au.

An exhaust gas cleaner consisting of a mixture of 3.7 g of the first catalyst (silver-salt catalyst) and 1.8 g of the second catalyst (gold catalyst) was charged into a reactor pipe.

Figure 5:
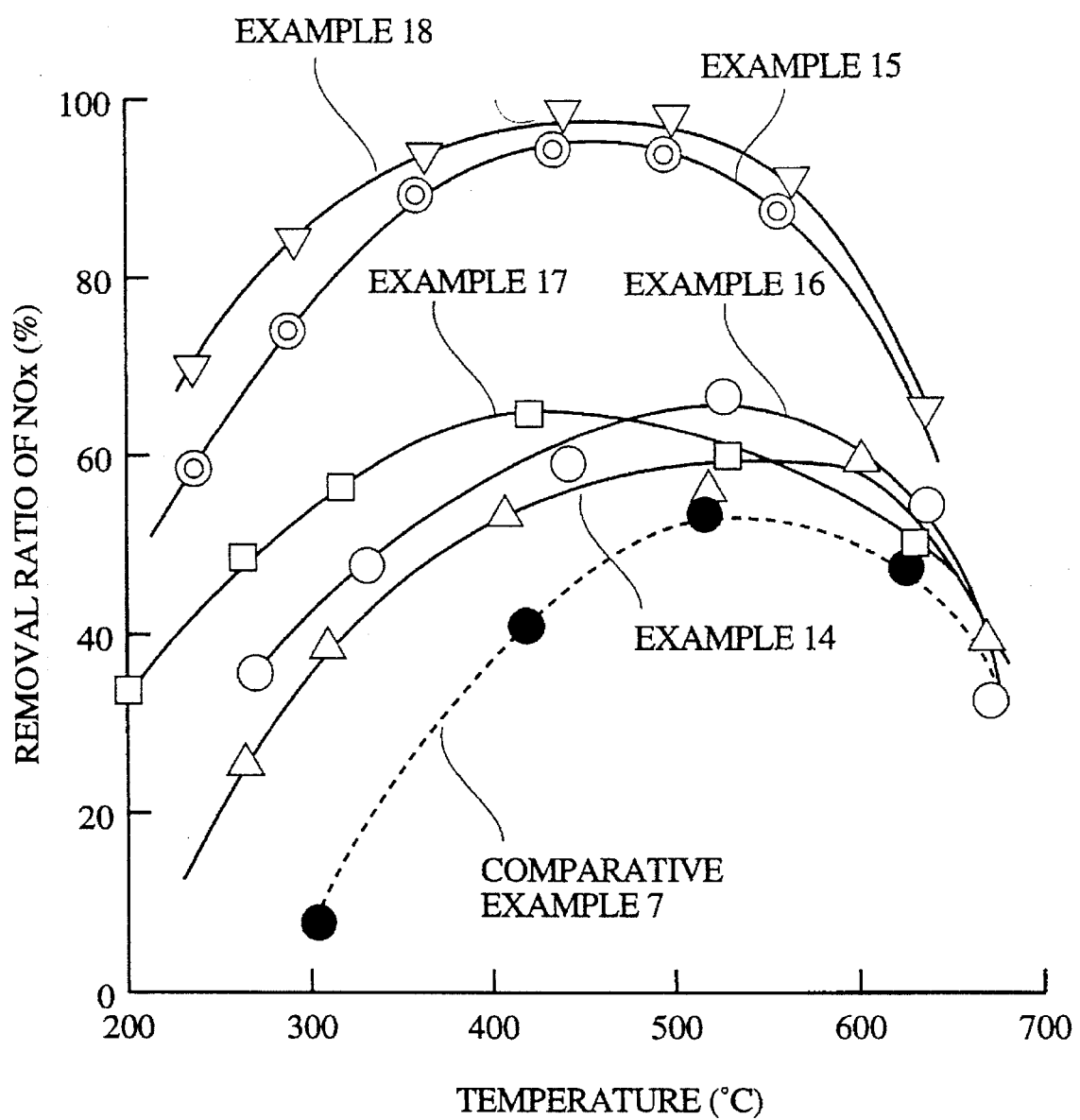
FIG. 5 is a graph showing the relation between the removal ratio of NOx and the temperature of the exhaust gas in Examples 14–18 and Comparative Example 7.

Next, a test gas having the composition shown in Table 9 was caused to pass through the reactor pipe at a rate of 4.4 liters per minute (normal state), which corresponded to an overall apparent space velocity of 20,000 h$^{-1}$ and catalyst ratios of the first and second catalysts of 0.05 sec.g/ml and 0.025 sec.g/ml, respectively. The temperature of the test gas was kept at 250° C. in the reactor pipe to cause a reaction between nitrogen monoxide and propylene in the test gas. The test was repeated while changing the temperature of the test gas as shown in FIG. 5.

TABLE 9

| Component | Concentration |
| --- | --- |
| Nitrogen monoxide | 800 ppm |
| Carbon monoxide | 100 ppm |
| Oxygen | 10 volume % |
| Propylene | 1600 ppm |
| Nitrogen | Balance |
| Water | 10 volume % of the total volume of the above components |

The concentration of nitrogen oxides (sum of nitrogen monoxide and nitrogen dioxide), in the test gas after passing through the exhaust gas cleaner was measured by a chemiluminescence analyzer to determine the removal ratio of nitrogen oxides. The results are shown in FIG. 5.

EXAMPLE 15

With the test gas having the same composition as in Table 9 except for containing ethanol in an amount three times that of nitrogen monoxide instead of propylene, the same tests as in Example 14 were conducted using the exhaust gas cleaner prepared in Example 14. The results are shown in FIG. 5.

EXAMPLE 16

In the same manner as in Example 14, γ-alumina powder (specific surface area: 200 m²/g) carrying 4 weight % (on a metal basis) of silver chloride having an average diameter of 200 nm was prepared. 1 g of the resulting first catalyst (silver-salt catalyst) was supported on a commercially available honeycomb-type cordierite filter (diameter: 30 mm, length: 12.6 mm, 400 cells/in²) by a wash-coating method, dried and then heated to 600° C. stepwise to prepare an exhaust gas cleaner part carrying the silver-salt catalyst.

Further, in the same manner as in Example 14, titania powder (specific surface area: 50 m²/g) carrying 1 weight % (on a metal basis) of gold was prepared. 0.4 g of the resulting second catalyst (gold catalyst) was coated onto a honeycomb-type cordierite filter (diameter: 30 mm, length: 6 mm, 400 cells/in²), dried and then heated to 700° C. to prepare an exhaust gas cleaner part carrying the gold catalyst.

With the silver catalyst on the inlet side and the gold catalyst on the outlet side, these exhaust gas cleaner parts were combined and charged in a reactor pipe. Under the same conditions (overall apparent space velocity: 20,000 h$^{-1}$) as in Example 14, tests were conducted using the test gas having the composition shown in Table 9. The results are shown in FIG. 5.

EXAMPLE 17

With the test gas having the same composition as in Table 9 except for containing kerosene in an amount three times that of nitrogen monoxide instead of propylene, the same tests as in Example 16 were conducted using the exhaust gas cleaner prepared in Example 16. The results are shown in FIG. 5.

EXAMPLE 18

With the test gas having the same composition as in Table 9 except for containing ethanol in an amount three times that of nitrogen monoxide instead of propylene, the same tests as in Example 16 were conducted using the exhaust gas cleaner prepared in Example 16. The results are shown in FIG. 5.

Comparative EXAMPLE 7

An exhaust gas cleaner comprising γ-alumina pellets carrying 2 weight % (on a metal basis) of silver chloride having an average diameter of 180 nm was prepared in the same manner as in Example 14. 3.6 g of this exhaust gas cleaner was charged in a reactor pipe, and tests were conducted using the test gas having the composition shown in Table 9 under the same conditions as in Example 16. The results are shown in FIG. 5.

As is clear from FIG. 5, the exhaust gas cleaners in Examples 14–18 can provide high removal ratios of nitrogen oxides in a wide temperature range of the exhaust gas. On the other hand, the exhaust gas cleaners in Comparative Example 7 are effective only in a narrow temperature range of the exhaust gas.

EXAMPLE 19

In the same manner as in Example 7, 4 weight % (on a metal basis) of silver chloride having an average diameter of 250 nm was carried on commercially available γ-alumina pellets (diameter: 1.5 mm, length: 6 mm, specific surface area: 200 m²/g) to prepare a first catalyst (silver-salt catalyst).

Separately, commercially available titania pellets (diameter: 1.5 mm, length: 6 mm, specific surface area: 20 m²/g) were immersed in an aqueous solution of chloroauric acid, dried and then heated to 700° C. to prepare a second catalyst (gold catalyst) carrying 1 weight % of Au.

Further, commercially available γ-alumina pellets (diameter: 1.5 mm, length: 6 mm, specific surface area: 200 m²/g) were immersed in an aqueous solution of chloroplatinic acid, dried and then heated to 700° C. to prepare a third catalyst (platinum catalyst) carrying 2 weight % of Pt.

An exhaust gas cleaner consisting of a mixture of 3.7 g of the first catalyst (silver-salt catalyst), 1.8 g of the second catalyst (gold catalyst) and 1.8 g of the third catalyst (platinum catalyst) was charged into a reactor pipe.

Figure 6:
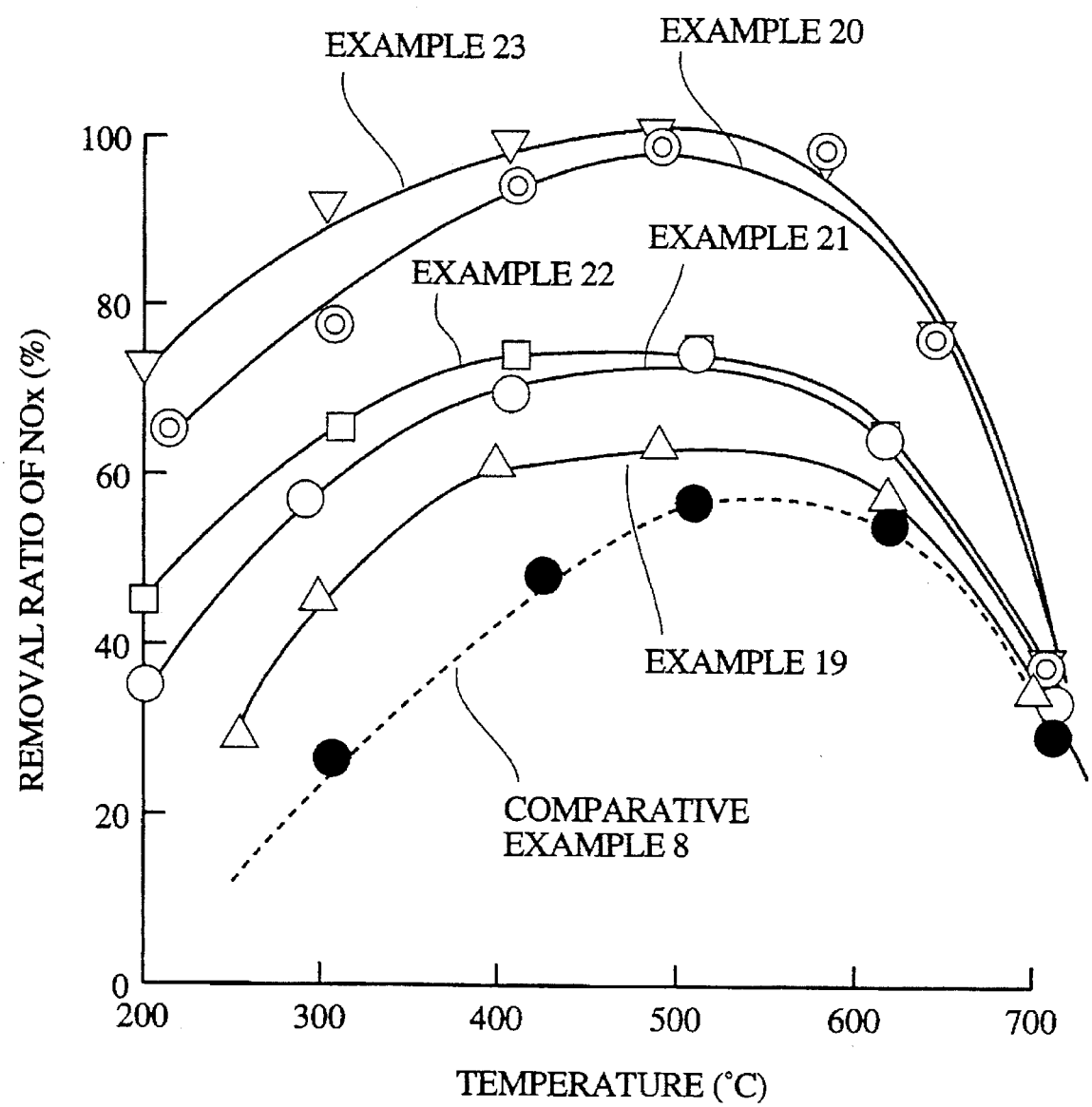
FIG. 6 is a graph showing the relation between the removal ratio of NOx and the temperature of the exhaust gas in Examples 19–23 and Comparative Example 8.

Next, a test gas having the composition shown in Table 9 was caused to pass through the reactor pipe at a rate of 4.4 liters per minute (normal state), which corresponded to an overall apparent space velocity of 15,000 h⁻¹ and catalyst ratios of the first, second and third catalysts of 0.05 sec.g/ml, 0.025 sec.g/ml and 0.025 sec.g/ml, respectively. The temperature of the test gas was kept at about 250° C. in the reactor pipe to cause a reaction between nitrogen monoxide and propylene in the test gas. The test was repeated while changing the temperature of the test gas as shown in FIG. 6.

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in FIG. 6.

EXAMPLE 20

With the test gas having the same composition as in Table 9 except for containing ethanol in an amount three times that of nitrogen monoxide instead of propylene, the same tests as in Example 19 were conducted using the exhaust gas cleaner prepared in Example 19. The results are shown in FIG. 6.

EXAMPLE 21

In the same manner as in Example 19, γ-alumina powder (specific surface area: 200 m²/g) carrying 2 weight % (on a metal basis) of silver chloride having an average diameter of 180 nm was prepared. 1 g of the resulting first catalyst (silver-salt catalyst) was supported on a commercially available honeycomb-type cordierite filter (diameter: 30 mm, length: 12.6 mm, 400 cells/in²) by a wash-coating method, dried and then heated to 600° C. stepwise to prepare an exhaust gas cleaner part carrying the silver-salt catalyst.

Next, in the same manner as in Example 19, titania powder (specific surface area: 50 m²/g) carrying 1 weight % (on a metal basis) of gold was prepared. 0.4 g of the resulting second catalyst (gold catalyst) was coated onto a honeycomb-type cordierite filter (diameter: 30 mm, length: 6 mm, 400 cells/in²), dried and then heated to 700° C. to prepare an exhaust gas cleaner part carrying the gold catalyst.

Further, in the same manner as in Example 19, γ-alumina powder (specific surface area: 200 m²/g) carrying 1 weight % (on a metal basis) of platinum was prepared. 0.4 g of the resulting third catalyst (platinum catalyst) was coated onto a honeycomb-type cordierite filter (diameter: 30 mm, length: 6 mm, 400 cells/in²), dried and then heated to 700° C. to prepare an exhaust gas cleaner part carrying the platinum catalyst.

With the silver-salt catalyst on the inlet side, the gold catalyst in an intermediate portion and the platinum catalyst on the outlet side, these exhaust gas cleaner parts were combined and charged in a reactor pipe. Under the same conditions (an overall apparent space velocity of 15,000 h⁻¹) as in Example 19, tests were conducted using the test gas having the composition shown in Table 9. The results are shown in FIG. 6.

EXAMPLE 22

With the test gas having the same composition as in Table 9 except for containing kerosene in an amount three times that of nitrogen monoxide instead of propylene, the same tests as in Example 21 were conducted using the exhaust gas cleaner prepared in Example 21. The results are shown in FIG. 6.

EXAMPLE 23

With the test gas having the same composition as in Table 9 except for containing ethanol in an amount three times that of nitrogen monoxide instead of propylene, the same tests as in Example 21 were conducted using the exhaust gas cleaner prepared in Example 21. The results are shown in FIG. 6.

Comparative Example 8

An exhaust gas cleaner comprising γ-alumina pellets carrying 5 weight % (on a metal basis) of silver chloride having an average diameter of 250 nm was prepared in the same manner as in Example 19. 3.6 g of this exhaust gas cleaner was charged in a reactor pipe, and tests were conducted using the test gas having the composition shown in Table 9 under the same conditions as in Example 19. The results are shown in FIG. 6.

As is clear from FIG. 6, the exhaust gas cleaners in Examples 19–23 can provide high removal ratios of nitrogen oxides in a wide temperature range of the exhaust gas. On the other hand, the exhaust gas cleaners in Comparative Example 8 are effective only in a narrow temperature range of the exhaust gas.

As is described above in detail, by the exhaust gas cleaner according to the present invention, nitrogen oxides, and optionally carbon monoxide and hydrocarbons can be efficiently removed from the exhaust gas having an excess oxygen concentration in a wide temperature range. The exhaust gas cleaner and the method of the present invention are effective for removing nitrogen oxides, and optionally carbon monoxide and hydrocarbons from exhaust gases such as those discharged from various combustors, automobile engines, etc.

What is claimed is:

1. A method for removing nitrogen oxides from an exhaust gas discharged from engines operated under oxygen excess conditions, said exhaust gas containing nitrogen oxides and oxygen in an amount larger than its stoichiometric amount relative to unburned components in said exhaust gas, which comprises:

(i) disposing an exhaust gas cleaner in a flow path of said exhaust gas, said exhaust gas cleaner consisting essentially of a first catalyst forming an inlet side of said exhaust gas cleaner and a second catalyst forming an outlet side of said exhaust gas cleaner, said first catalyst consisting essentially of a porous inorganic oxide supporting 0.2–15 weight % (on a metal basis) of at least one silver salt selected from the group consisting of silver halides, silver sulfate and silver phosphate, and said second catalyst consisting essentially of a porous inorganic oxide supporting (a) 0.2–15 weight % (on a metal basis) of at least one silver salt selected from the group consisting of silver halides, silver sulfate and silver phosphate and (b) a catalytic amount of copper or copper oxide up to 2 weight % (on a metal basis);

(ii) introducing at least one reducing agent selected from hydrocarbons and oxygen-containing organic compounds into said exhaust gas on an upstream side of said exhaust gas cleaner; and (iii) bringing said exhaust gas into contact with said exhaust gas cleaner at a temperature of 200°–600° C., thereby causing a reaction of said nitrogen oxides with said reducing agent to remove said nitrogen oxides in an oxygen excess atmosphere.

2. A method for cleaning an exhaust gas discharged from engines operated under oxygen excess conditions by removing nitrogen oxides by reduction and carbon monoxide and hydrocarbons by oxidation from said exhaust gas, and wherein the exhaust gas contains nitrogen oxides, unburned components comprising carbon monoxide and hydrocarbons, and oxygen in an amount larger than its stoichiometric amount relative to said unburned components, which comprises:

(i) disposing an exhaust gas cleaner in a flow path of said exhaust gas, said exhaust gas cleaner consisting essentially of first, second and third catalysts in this order from an inlet side to an outlet side of said exhaust gas cleaner, said first catalyst consisting essentially of a porous inorganic oxide supporting 0.2–15 weight % (on a metal basis) of at least one silver salt selected from the group consisting of silver halides, silver sulfate and silver phosphate, said second catalyst consisting essentially of a porous inorganic oxide supporting (a) 0.2–15 weight % (on a metal basis) of at least one silver salt selected from the group consisting of silver halides, silver sulfate and silver phosphate and (b) a catalytic amount of copper or copper oxide up to 2 weight % (on a metal basis), and said third catalyst consisting essentially of a porous inorganic oxide supporting a catalytic amount of at least one element selected from the group consisting of Pt, Pd, Ru, Rh, Ir and Au in an amount up to 2 weight % (on a metal basis);

(ii) introducing at least one reducing agent selected from hydrocarbons and oxygen-containing organic compounds into said exhaust gas on an upstream side of said exhaust gas cleaner; and (iii) bringing said exhaust gas into contact with said exhaust gas cleaner at a temperature of 200°–600° C., thereby causing a reaction of said nitrogen oxides with said reducing agent to remove nitrogen oxides, carbon monoxide and hydrocarbons in an oxygen excess atmosphere.

3. A method for removing nitrogen oxides from an exhaust gas discharged from engines operated under oxygen excess conditions, said exhaust gas containing nitrogen oxides and oxygen in an amount larger than its stoichiometric amount relative to unburned components in said exhaust gas, which comprises:

(i) disposing an exhaust gas cleaner in a flow path of said exhaust gas, said exhaust gas cleaner consisting essentially of a first catalyst consisting essentially of a porous inorganic oxide supporting 0.2–15 weight % (on a metal basis) of at least one silver salt selected from the group consisting of silver halides, silver sulfate and silver phosphate and having an average diameter of 10–1000 nm, and a second catalyst consisting essentially of a porous inorganic oxide supporting 0.02–5 weight % (on a metal basis) of at least one element selected from the group consisting of Pt, Pd, Ru, Rh, Ir and Au;

(ii) introducing at least one reducing agent selected from hydrocarbons and oxygen-containing organic compounds into said exhaust gas on an upstream side of said exhaust gas cleaner; and (iii) bringing said exhaust gas into contact with said exhaust gas cleaner at a temperature of 150°–650° C., thereby causing a reaction of said nitrogen oxides with said reducing agent to remove said nitrogen oxides in an oxygen excess atmosphere.

4. A method for removing nitrogen oxides from an exhaust gas discharged from engines operated by using as a fuel mixed hydrocarbons of liquefied petroleum gas, town gas or liquefied natural gas under oxygen excess conditions, said exhaust gas containing nitrogen oxides and oxygen in an amount larger than its stoichiometric amount relative to unburned components in said exhaust gas, which comprises:

(i) disposing an exhaust gas cleaner in a flow path of said exhaust gas, said exhaust gas cleaner consisting essentially of a first catalyst consisting essentially of a porous inorganic oxide supporting 0.2–15 weight % (on a metal basis) of at least one silver salt selected from the group consisting of silver halides, silver sulfate and silver phosphate, and a second catalyst consisting essentially of a porous inorganic oxide supporting 0.02–5 weight % (on a metal basis) of a least one element selected from the group consisting of Pt, Pd, Ru, Rh, Ir and Au;

(ii) introducing at least one hydrocarbon selected from the group consisting of liquefied petroleum gas, town gas, liquefied natural gas, methane and ethane into said exhaust gas on an upstream side of said exhaust gas cleaner; and (iii) bringing said exhaust gas into contact with said exhaust gas cleaner at a temperature of 150°–650° C., thereby causing a reaction of said nitrogen oxides with said hydrocarbon to remove said nitrogen oxides in an oxygen excess atmosphere.

* * * * *